(12) United States Patent
Michael et al.

(10) Patent No.: US 12,288,146 B2
(45) Date of Patent: Apr. 29, 2025

(54) DISTRIBUTED CLIENT SERVER SYSTEM FOR GENERATING PREDICTIVE MACHINE LEARNING MODELS

(71) Applicant: Ox Mountain Limited, Oxford (GB)

(72) Inventors: Sam Michael, Mosman (AU); Charles Dibsdale, Chepstow (GB)

(73) Assignee: OX MOUNTAIN LIMITED, Oxford (GB)

( * ) Notice: Subject to any disclaimer, the term of this patent is extended or adjusted under 35 U.S.C. 154(b) by 340 days.

(21) Appl. No.: 17/965,885

(22) Filed: Oct. 14, 2022

(65) Prior Publication Data
US 2023/0123527 A1     Apr. 20, 2023

Related U.S. Application Data

(60) Provisional application No. 63/255,546, filed on Oct. 14, 2021.

(51) Int. Cl.
*G06N 20/20* (2019.01)
*G05B 23/02* (2006.01)

(52) U.S. Cl.
CPC ......... *G06N 20/20* (2019.01); *G05B 23/0221* (2013.01); *G05B 23/0243* (2013.01)

(58) Field of Classification Search
None
See application file for complete search history.

(56) References Cited

U.S. PATENT DOCUMENTS

| 6,850,252 B1* | 2/2005 | Hoffberg | H04N 21/475 380/252 |
|---|---|---|---|
| 2008/0062211 A1 | 3/2008 | Kamisuwa | |
| 2008/0228314 A1 | 9/2008 | Sjostrand | |
| 2009/0083250 A1 | 3/2009 | Riksheim | |
| 2011/0137697 A1 | 6/2011 | Yedatore | |
| 2014/0351642 A1 | 11/2014 | Bates | |
| 2018/0173214 A1 | 6/2018 | Higgins | |
| 2018/0284758 A1* | 10/2018 | Cella | H04L 67/12 |
| 2018/0307221 A1 | 10/2018 | Cline | |

(Continued)

OTHER PUBLICATIONS

Moghaddam. "Preventive Maintenance and Replacement Scheduling: Models and Algorithms." Department of Industrial Engineering, University of Louisville. Nov. 2008. 93 pages.

*Primary Examiner* — Huy Q Phan
*Assistant Examiner* — Carl F. R. Tchatchouang
(74) *Attorney, Agent, or Firm* — ROSSI, KIMMS & McDOWELL LLP

(57) ABSTRACT

A client-server system that performs machine learning based information fusion to predict part failure likelihood is described. The system receives transactional data pertaining to replacement of, and sensor data pertaining to duty cycle of, one or more parts. The system trains a first machine learning model, using the transactional data as training data, to extract a plurality of concepts corresponding to the information present in unstructured text in the transactional data. The system also trains a second machine learning model, using the sensor data and the extracted plurality of concepts, to predict part failure likelihood of the one or more parts. The system determines the part failure likelihood of the one or more parts by providing new transactional data and new sensor data to the trained machine learning models.

10 Claims, 28 Drawing Sheets

(56) References Cited

U.S. PATENT DOCUMENTS

| | | |
|---|---|---|
| 2018/0349827 A1 | 12/2018 | Slovensky |
| 2019/0121338 A1* | 4/2019 | Cella ........................ H02M 1/12 |
| 2019/0251489 A1 | 8/2019 | Berti |
| 2020/0265331 A1 | 8/2020 | Tashman |
| 2021/0114368 A1* | 4/2021 | Ukishima .............. G06N 3/084 |

* cited by examiner

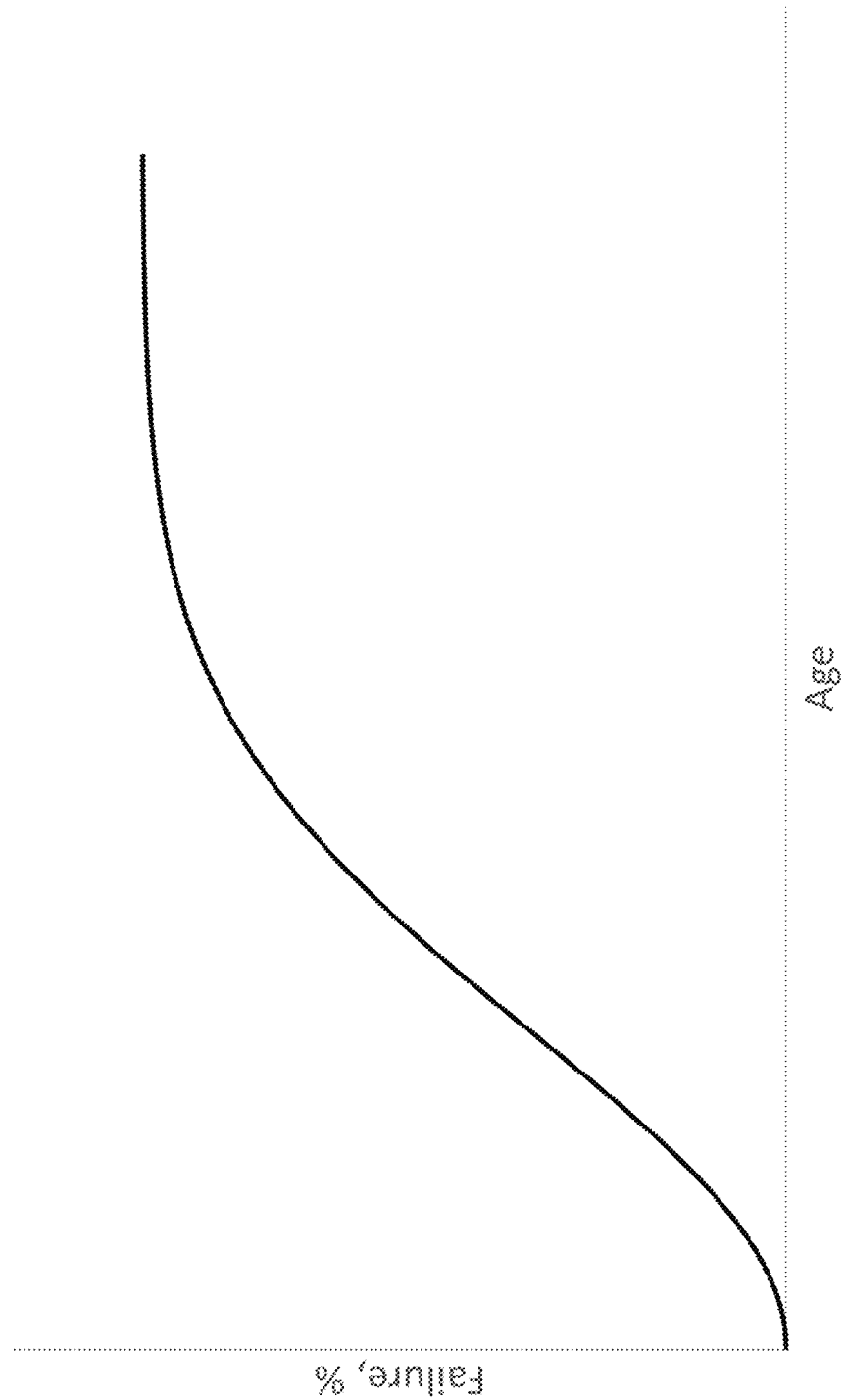

FIG. 15

| | Material Number | Part Description | Average Part Cost (AUD) | Strategy | IM Assessment | Decision |
|---|---|---|---|---|---|---|
| 1 | 88891519 | ENG ASSY 5920 | $495,133 | Run to failure | ◎ 18000H | Modify |
| 2 | 88890717 | ENGINEAR-B, 4212009 | $319,450 | On Condition | ◎ 12000H | Modify |
| 3 | | 2507100 Engine (Warranty) | $261,309 | Run to failure | ◎ 15000H | Modify |
| 4 | 88890663 | TRANSMISSION, 2792520 | $68,047 | 18000H | ● 19800H | Modify |
| 5 | 88890794 | DIFF ASSY 5920 2801609 | $33,691 | 24000H | ○ No change | Modify |
| 6 | 88890792 | TRANS 5920 2792520 | $30,450 | 18000H | ○ No change | Modify |

DISTRIBUTED CLIENT SERVER SYSTEM FOR GENERATING PREDICTIVE MACHINE LEARNING MODELS

CROSS REFERENCE TO RELATED APPLICATIONS

This application claims priority to U.S. Provisional Patent Application No. 63/255,546, filed Oct. 14, 2021. The entire disclosure of the documents cited in this section is hereby incorporated herein by reference.

TECHNICAL FIELD OF THE INVENTION

Aspects of this disclosure generally are related to architectures and methods for a global distributed client server system. The client server system executes methods of generating predictive machine learning models, which improve maintenance strategies applied to a portfolio of assets in capital intensive industries, by combining transactional data from maintenance management systems with sensor data from the assets. More particularly, but not exclusively, the present invention relates to a globally distributed architecture including local, intermediate, and global client processes and data stores, and central servers that execute an asset management system including the accurate determination of the age of parts across a portfolio of assets using the machine learning models by extracting and consolidating maintenance records and sensor data using natural language processing, asset ontologies, and automated statistical analysis.

BACKGROUND OF THE INVENTION

Capital intensive industries such as, for example but not limited to, mining, freight-rail, shipping, power generation, and oil and gas, operate complex machinery round the clock in remote and challenging conditions. The operations may be limited to a single site or span multiple sites across a geographic region, continent, or the globe. Site operations, including asset management and part replacement, may be managed locally at each site. However, it is more typical and useful to be able to exchange data between different sites of the same type (e.g., mines in different locations), so as to allow the local operations of each site to view operational and maintenance data of other sites for benchmarking and modifying local operations.

When a piece of equipment is replaced as part of a planned or unplanned maintenance, the replacement work is requested in a notification. The task description is recorded in an associated work order that is fed into the operation's maintenance management system, which may be stored locally. Work orders may include the data contained in notifications. The information from work orders inform future part replacement strategies in order to cost-effectively maximise uptime. Each local site's operation's maintenance management system may feed transactional data to a central server, that acts as a client to a global operation's maintenance management system.

In a typical capital-intensive organisation, data is extracted from the operation's maintenance management system and analyses to determine optimal maintenance strategies. The analysis generally consists of focusing on a specific part at a time, identified by its type and position in an asset, and gathering all the work order records where that part was replaced in order to calculate aggregate failure statistics. This analysis is further complicated in a case where a plurality of parts of a single part type is fitted on an asset, and only some parts of the plurality of parts have been replaced. Further, work orders are often incomplete and lack crucial information for identifying the position of the replaced part or identifying the cause of the replacement, which could in turn identify the position.

These discrepancies and inconsistencies may occur due to operational pressures which lead to work orders being completed quickly and inaccurately. Additionally, functionally equivalent parts may be identified by different part number identification codes, for example, because they are sourced from different manufacturers. Due to these challenges, it is impractical, if not impossible, to manually reconstruct the history of one specific part type fitted in a portfolio of assets. A portfolio of assets can include fixed plant assets and fleets of similar assets. Even if the history of a part type could be estimated using manual processes, inconsistent and incomplete data prevents an accurate determination of the age of each example of that part at the time of replacement across the portfolio of assets of a specific operation. Thus, conventional manual processes for maintenance scheduling do not scale to global operations.

Determining the age is important to generate predictive part maintenance and replacement strategies, and requires tracking the dates of part replacement, by position, for each asset across the portfolio. The resulting age calculation determines the replacement rate or percentage of parts which were replaced at any given operating age for that part type within that portfolio. The age function statistics can then be used to determine optimal part replacement strategies, as well as uncover suboptimal maintenance processes within a site. For a large organisation, with many different portfolios of assets, each with different parts, conventional manual processes for reliability engineering are only able to analyse a very small proportion of parts, generally in an isolated local context. Moreover, processing work orders manually to determine the age function is error prone and the sheer number of parts to monitor does not permit the derived maintenance strategies to scale or be approached holistically across the entire portfolio of operating assets.

Because of the work order quality and type diversity within and between industries, no solution has been developed to automatically reconstruct part histories across a portfolio of assets in order to sustainably determine the age function for every single part at any given time.

One alternative option to the manual conventional process described above is to extract maintenance insights from equipment sensors or telemetry data and use predictive maintenance technology to optimise maintenance and replacement strategies. One example is Uptake®, which may use machine learning models and asset sensor data to predict when the next failures are likely to occur, so that corrective maintenance can be performed.

In current predictive maintenance systems, the sensor data may be analysed to detect anomalies in the sensor data trends that are indicative of asset failure. A minority of these systems may isolate fault condition to individual parts and their failure patterns, and provide a prognosis of how long it will be until the point of functional failure, as the part's condition deteriorates. Thus, predictive maintenance may enable an organisation to plan and predispose resources for corrective maintenance. However, a key drawback of these predictive maintenance solutions is that they rely heavily on assets or machinery having sufficient sensors and access to their data, sampled frequently, to be effective. Given the high cost of installing sensors, generally, only a subset of parts and machinery in an asset fleet are instrumented. Thus, these sensor-only solutions cannot provide comprehensive part maintenance strategies across a deployed portfolio of assets.

A second problem with conventional predictive maintenance systems is that they cannot account for sudden or unexpected failures. Current predictive maintenance solutions rely on parts slowly deteriorating after failure inception before they reach functional failure. However, many parts fail suddenly without warning and are not suitable for current predictive maintenance analysis. Thus, current predictive maintenance solutions can, at best, only address a subset of parts in a portfolio of asserts and cannot be used to fully optimise and manage a complete portfolio of part maintenance.

Accordingly, there is a need to improve the quality of maintenance process insights from transactional maintenance records by combining the transactional data with sensor data and to be able to efficiently calculate age functions for each set of parts of a portfolio of assets at scale to provide comprehensive maintenance and replacement solutions for all parts in the portfolio of assets. Transactional data is generally stored as unstructured data, while sensor data is generally stored as structured time-series data in a historian database, and the two cannot be combined using conventional methods. New technical solutions for effectively combining the knowledge within unstructured transactional data, which may be stored in a server, with structured time-series sensor data, which may be located at a plurality of client sites, are needed. Further, technical solutions for analyzing the combined data and extraction actionable intelligence, using machine learning techniques, are required.

SUMMARY OF THE INVENTION

At least the above-discussed need is addressed, and technical solutions are achieved in the art by various embodiments of the present invention. According to a first embodiment of the invention a client-server system that performs machine learning based information fusion to predict part failure likelihood of a plurality of parts in one or more assets of a portfolio comprises at least one computer accessible-storage device configured to store instructions, and at least one processor communicatively connected to the at least one computer accessible storage device and configured to execute instructions that, when executed, provide a plurality of program modules including a data ingestion module, a data consolidation module, and a part-failure determination module. The data ingestion module is configured to receive transactional data pertaining to replacement of, and sensor data pertaining to duty cycle of, one or more parts of the plurality of parts in the one or more assets of the portfolio. The data consolidation module is configured to train a first machine learning model, using the transactional data as training data for the first machine learning model, to extract a plurality of concepts corresponding to the information present in unstructured text in the transactional data, and train a second machine learning model, using the sensor data and the plurality of concepts extracted as output from the first machine learning model as training data for the second machine learning model, to predict part failure likelihood of the one or more parts of the plurality of parts. The part failure determination module is configured to determine the part failure likelihood of the one or more parts of the plurality of parts by providing new transactional data and new sensor data to the trained first machine learning model and the trained second machine learning model.

In another embodiment of the invention, the data ingestion module is further configured to use timestamp information to associate pieces of transactional data with corresponding pieces of sensor data relating to a same event.

In another embodiment of the invention, the data consolidation module is further configured to generate an asset history, which includes information on replacement of the one or more parts of the plurality of parts in the one or more assets of the portfolio and information on the duty cycle of the one or more parts of the plurality of parts in the one or more assets of the portfolio, by analysing the plurality of concepts extracted as output from the first machine learning model, the sensor data, and the determined part failure likelihood of the one or more parts of the plurality of parts.

In another embodiment of the invention, the plurality of program modules further includes a remaining useful life determination module configured to train a third machine learning model, using the generated asset history and the determined part failure likelihood of the one or more parts of the plurality of parts as training data for the third machine learning model, to predict a remaining useful life for the one or more parts of the plurality of parts, and determine the remaining useful life for the one or more parts of the plurality of parts by providing the new transactional data and the new sensor data to the trained third machine learning model.

In another embodiment of the invention, the client-server system includes a server and at least one client. A processor of the server is configured to execute the data ingestion module to receive the transactional data and the sensor data from the at least one client, and to execute the data consolidation module to train the first machine learning model and the second machine learning model. A processor of the at least one client is configured to execute the part failure determination module to determine the part failure likelihood of the one or more parts of the plurality of parts of the at least one client using the trained first machine learning model and the trained second machine learning model.

In another embodiment of the invention, the client-server system includes a server and a plurality of clients. A processor of the server is configured to execute the data ingestion module to receive the transactional data and the sensor data from the plurality of clients, and to execute the data consolidation module to train the first machine learning model and the second machine learning model. A first client of the plurality of clients includes a processor configured to execute the part failure determination module to determine the part failure likelihood of the one or more parts of the plurality of parts of the first client using the trained first machine learning model and the trained second machine learning model. A second client of the plurality of clients request the processor of the server to execute the part failure determination module to determine the part failure likelihood of the one or more parts of the plurality of parts of the second client using the trained first machine learning model and the trained second machine learning model.

In another embodiment of the invention, the data consolidation module is further configured to, in a case where an asset includes a plurality of parts of a same part type and less than all of the plurality of the parts has been replaced, determine a position of a replaced part among the plurality of the parts of the same part type in the asset, and train the first machine learning model and the second machine model by separating the transactional data and the sensor data for the same part type based on the determined position of the replaced part among the plurality of the parts of the same part type.

In another embodiment of the invention, the data consolidation module is further configured to, in a case where an asset includes a plurality of functionally equivalent parts having different identifiers, group the plurality of functionally equivalent parts as a same part type, and train the first machine learning model and the second machine model by grouping the transactional data and the sensor data for the functionally equivalent parts.

In another embodiment of the invention, a processor executed method of performing machine learning based information fusion to predict part failure likelihood of a plurality of parts in one or more assets of a portfolio comprises receiving transactional data pertaining to replacement of, and sensor data pertaining to duty cycle of, one or more parts of the plurality of parts in the one or more assets of the portfolio, training a first machine learning model, using the transactional data as training data for the first machine learning model, to extract a plurality of concepts corresponding to the information present in unstructured text in the transactional data, training a second machine learning model, using the sensor data and the plurality of concepts extracted as output from the first machine learning model as training data for the second machine learning model, to predict part failure likelihood of the one or more parts of the plurality of parts, determining the part failure likelihood of the one or more parts of the plurality of parts by providing new transactional data and new sensor data to the trained first machine learning model and the trained second machine learning model.

In another embodiment of the invention, a non-transitory computer readable storage medium is configured to store a program, executed by a computer, for a client-server system that performs machine learning based information fusion to predict part failure likelihood of a plurality of parts in one or more assets of a portfolio according to one or more embodiments of the client-server system discussed above.

Further, any or all of the methods and associated features thereof discussed herein may be implemented or executed by all or part of a device system, apparatus, or machine, such as all or a part of any of the systems, apparatuses, or machines described herein or a combination or sub-combination thereof.

BRIEF DESCRIPTION OF THE DRAWINGS

It is to be understood that the attached drawings are for purposes of illustrating aspects of various embodiments and may include elements that are not to scale. It is noted that like reference characters in different figures refer to the same objects.

FIGS. 14a and 14b show examples of a Weibull probability distribution and a Weibull cumulative distribution function respectively, for a part type associated with block 317 in accordance with an embodiment of the invention;

FIG. 15 shows an example of a graphical user interface for the predictive maintenance management system in accordance with an embodiment of the invention;

DETAILED DESCRIPTION OF THE INVENTION

Figure 1:
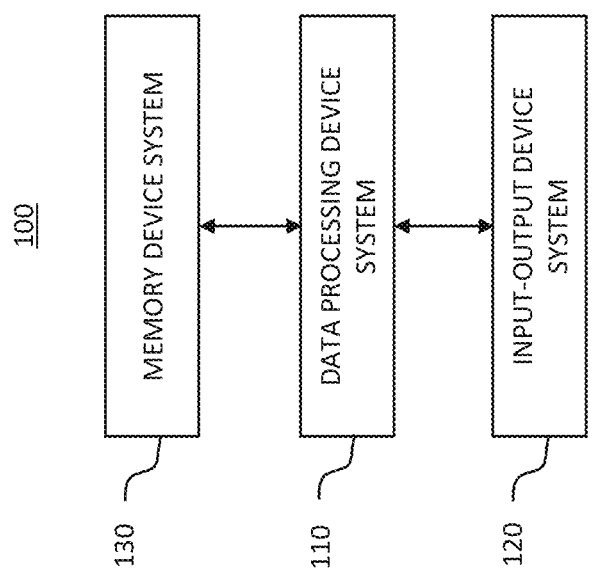
FIG. 1 shows an example of a computing device system in accordance with an embodiment of the invention.

The present invention provides a globally distributed client server architecture based system and method for efficiently consolidating maintenance management records, automatically calculating the age of each part across a portfolio of assets at scale, and generating predictive maintenance schedules and inventory management strategies. It should be noted that the invention is not limited to these or any other examples provided herein, which are referred to for purposes of illustration only.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects.

In the following description, some embodiments of the present invention may be implemented at least in part by a data processing device system configured by a software program. Such a program may equivalently be implemented as multiple programs, and some or all of such software program(s) may be equivalently constructed in hardware.

Further, the phrase "at least" is or may be used herein at times merely to emphasise the possibility that other elements may exist beside those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

The term "program" in this disclosure should be interpreted to include one or more programs including as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 251, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. Further, the phrase "graphical user interface" used herein is intended to include a visual representation presented via a display device system and may include computer-generated text, graphics, animations, or one or more combinations thereof, which may include one or more visual representations originally generated, at least in part, by an image-capture device.

Figure 4:
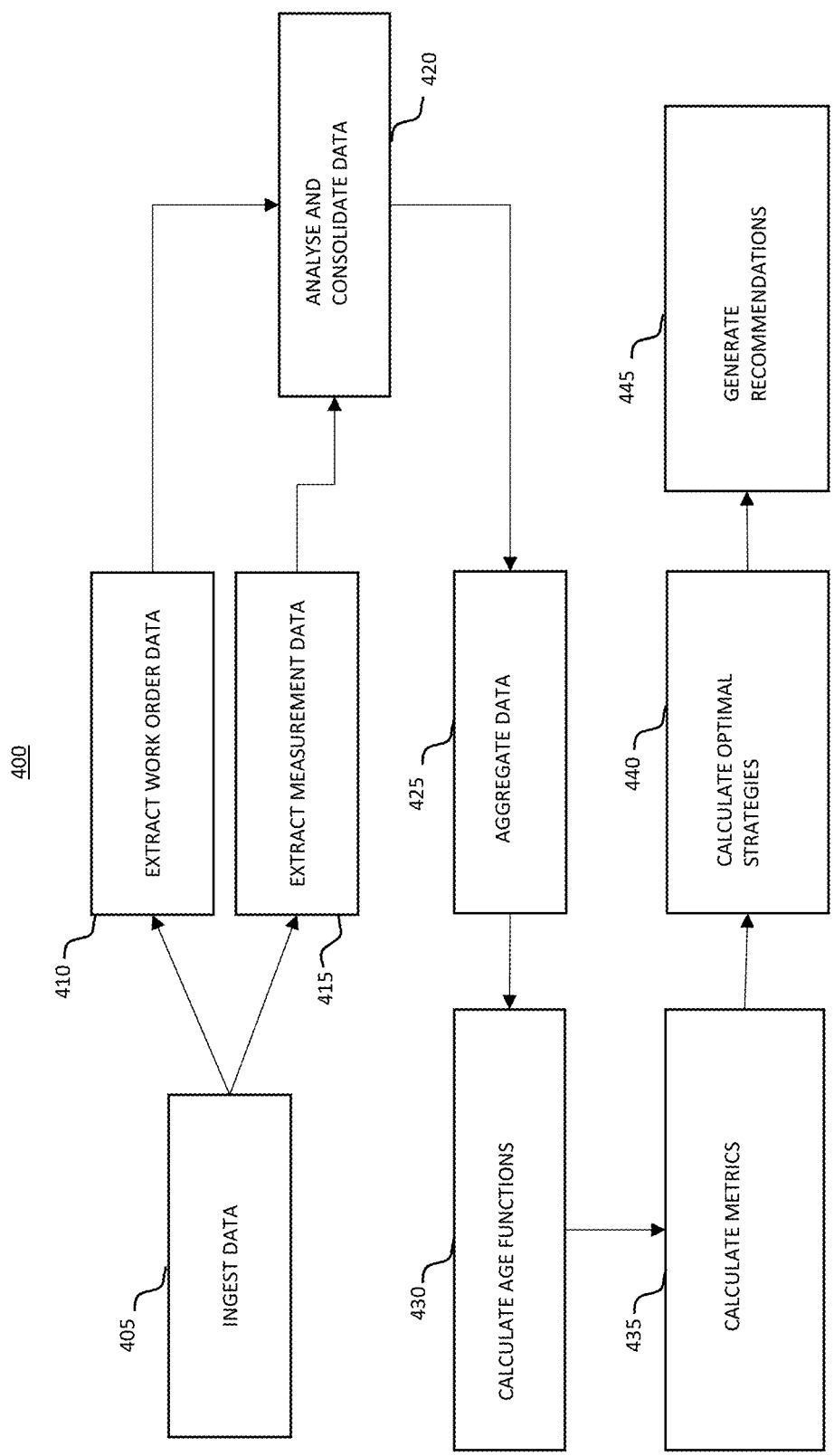
FIG. 4 shows a flow diagram illustrating a method of automatically calculating asset age and generating maintenance and replacement recommendations in accordance with an embodiment of the invention.
Figure 6:
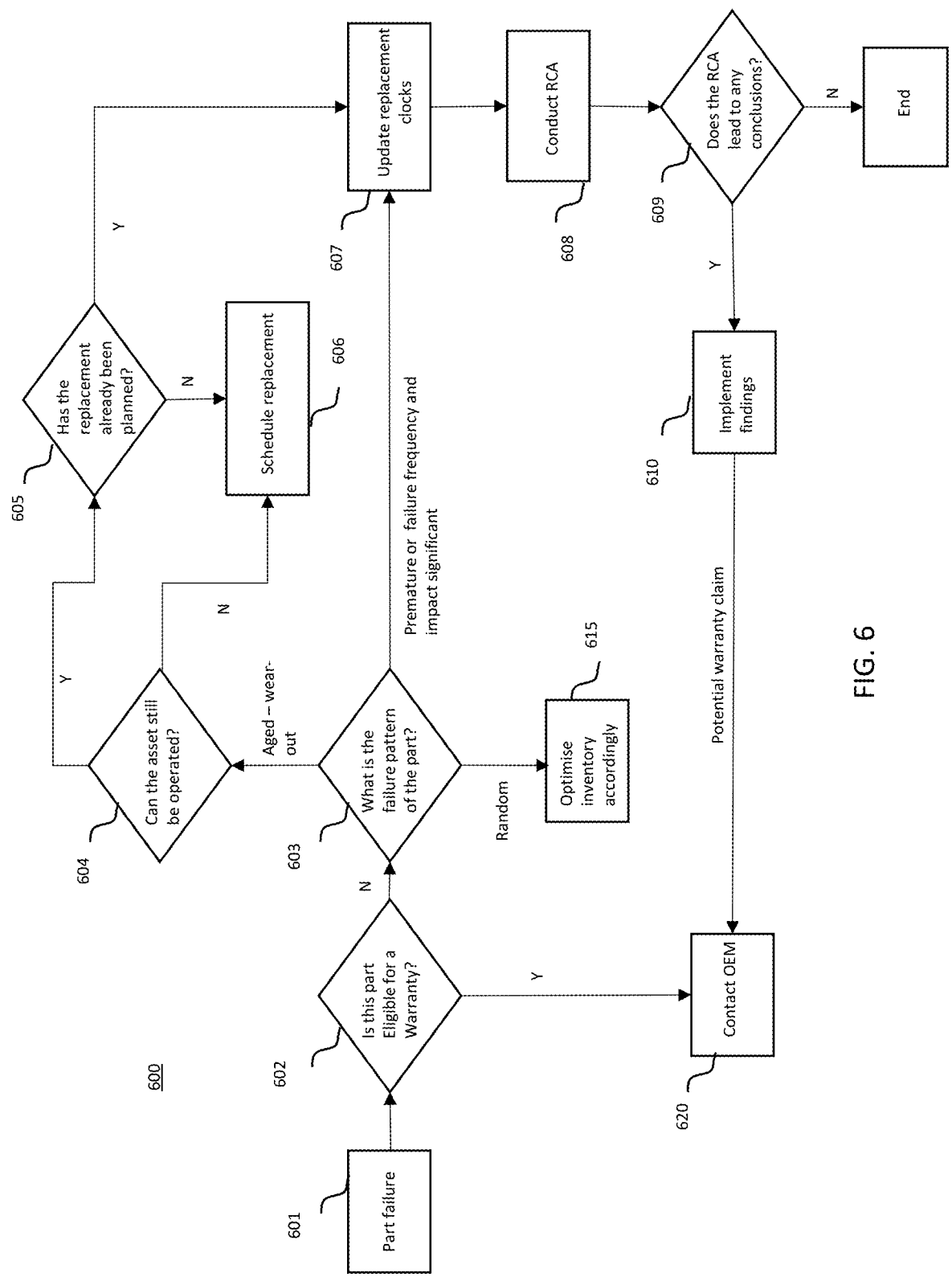
FIG. 6 shows a flow diagram illustrating a part-failure maintenance decision-making method of the maintenance management system in accordance with an embodiment of the invention.
Figure 27:
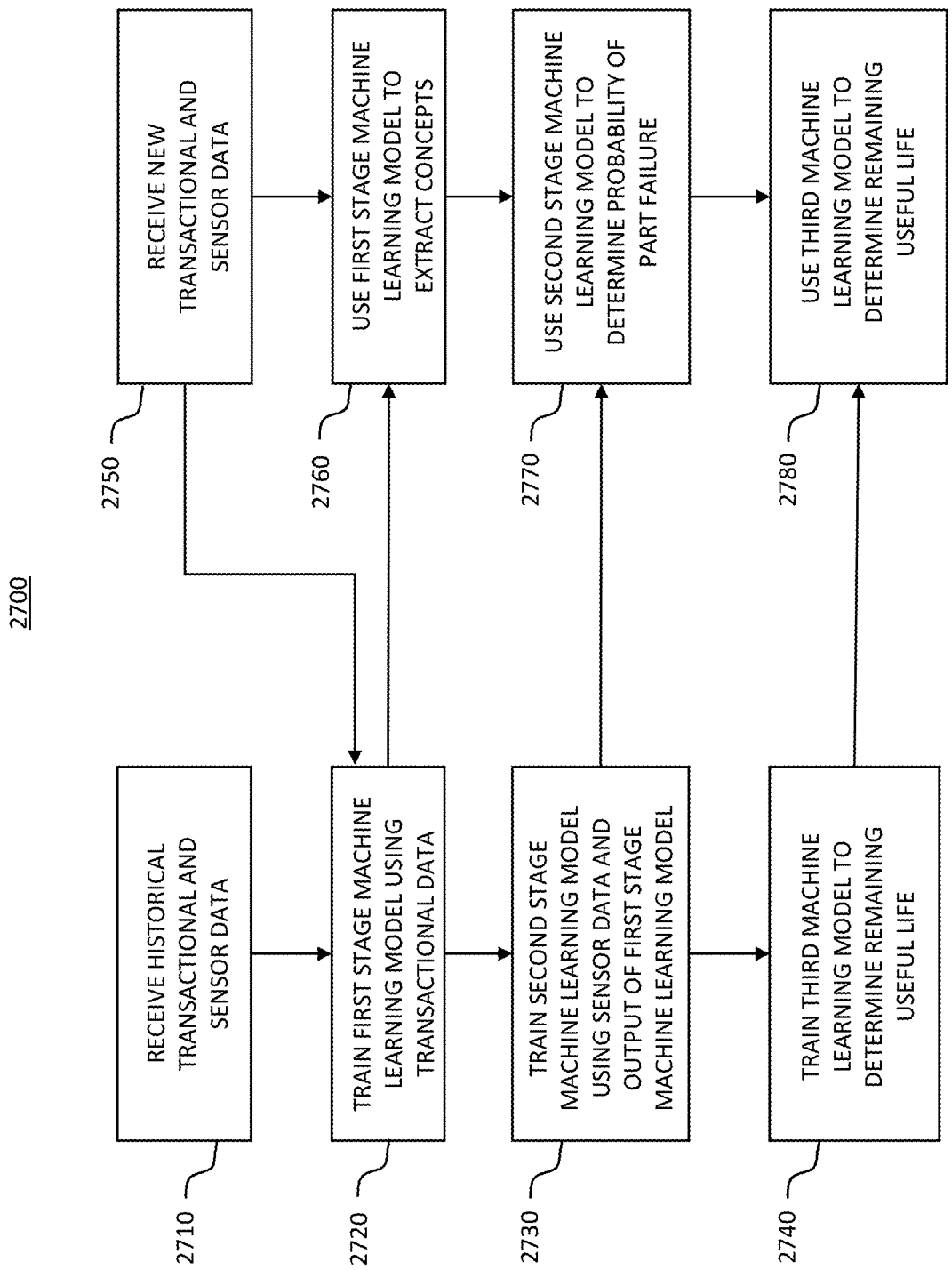
FIG. 27 shows a flow diagram illustrating a part failure likelihood and remaining useful life determination method of the maintenance management system in accordance with an embodiment of the invention.

Further still, example methods are described herein with respect to FIGS. 4, 6, and 27. Such figures are described to include blocks associated with computer-executable instructions. It should be noted that the respective instructions associated with any such blocks need not be separate instructions and may be combined with other instructions to form a combined instruction set. The same set of instructions may be associated with more than one block. In this regard, the block arrangement shown in methods FIGS. 4 and 6 herein is not limited to an actual structure of any program or set of instructions or required ordering of method tasks, and such methods FIGS. 4, 6, and 27 according to some embodiments, merely illustrate the tasks that instructions are configured to perform, for example upon execution by a data processing device system in conjunction with interactions with one or more other devices or device systems.

Moreover, block diagrams shown in FIGS. 3, 5, and 7-12 illustrate various program modules that are implemented by computer executable instructions. It should be noted that the respective instructions associated with any such program modules need not be separate instructions and may be combined with other instructions to form a combined instruction set. The same set of instructions may be associated with more than one program module. In this regard, the program modules of the block diagrams shown in FIGS. 3, 5, and 7-12 herein are not limited to an actual structure of any program or set of instructions or required ordering of method tasks, and such block diagrams shown in FIGS. 3, 5, and 7-12 according to some embodiments, merely illustrate the tasks that instructions are configured to perform, for example upon execution by a data processing device system in conjunction with interactions with one or more other devices or device systems.

Figure 2:
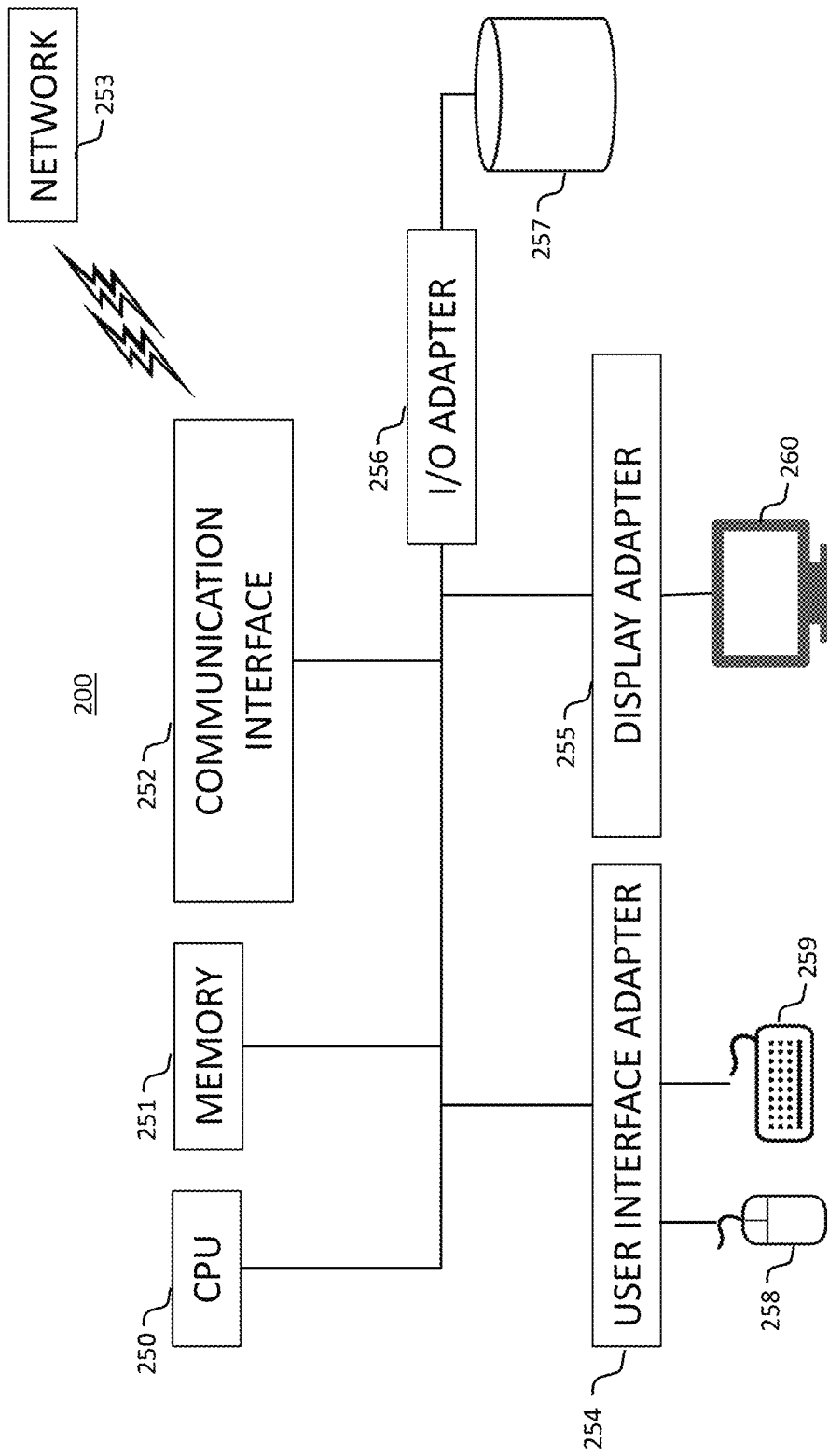
FIG. 2 shows another example of a computing device system in accordance with an embodiment of the invention.

FIG. 1 schematically illustrates a system 100 according to some embodiments. In some embodiments, the system 100 may be a computing device 100 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or non-volatile, electronic, magnetic, optical, or otherwise, including but not limited to, registers, floppy disks, hard disks, Compact Discs, DVDs, flash memories, ROMs (Read-Only Memory), and RAMs (Random Access Memory). In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 200, according to some embodiments. The computing device system 200 may include a processor 250, corresponding to the data processing device system 110 of FIG. 1, in some embodiments. The memory 251, input/output (I/O) adapter 256, and non-transitory storage medium 257 may correspond to the memory device system 130 of FIG. 1, according to some embodiments. The user interface adapter 254, mouse 258, keyboard 259, display adapter 255, and display 260 may correspond to the input-output device system 120 of FIG. 1, according to some embodiments. The computing device 100 may also include a communication interface 252 that connects to a network 253 for communicating with other computing devices 100.

Various methods 400, 600, and 2700 may be performed by way of associated computer-executable instructions according to some example embodiments. In various example embodiments, a memory device system (e.g., memory device system 130) is communicatively connected to a data processing device system (e.g., data processing device systems 110, otherwise stated herein as "e.g., 110") and stores a program executable by the data processing device system to cause the data processing device system to execute various embodiments of methods 400, 600, and 2700. In these various embodiments, the program may include instructions configured to perform, or cause to be performed, various ones of the instructions associated with execution of various embodiments of methods 400, 600, and 2700. In some embodiments, methods 400, 600, and 2700 may include a subset of the associated blocks or additional blocks than those shown in FIGS. 4, 6, and 27, respectively. In some embodiments, methods 400, 600, and 2700 may include a different sequence indicated between various ones of the associated blocks shown in FIGS. 4, 6, and 27, respectively.

In some embodiments of the invention, transactional maintenance records may be represented in a work order from an Enterprise Resource Planning (ERP system) and stored in a maintenance record storage system. It should be noted, however, that the type of maintenance record is not limited to the type of ERP system or the particular asset type or operation industry or geographic location.

Figure 3:
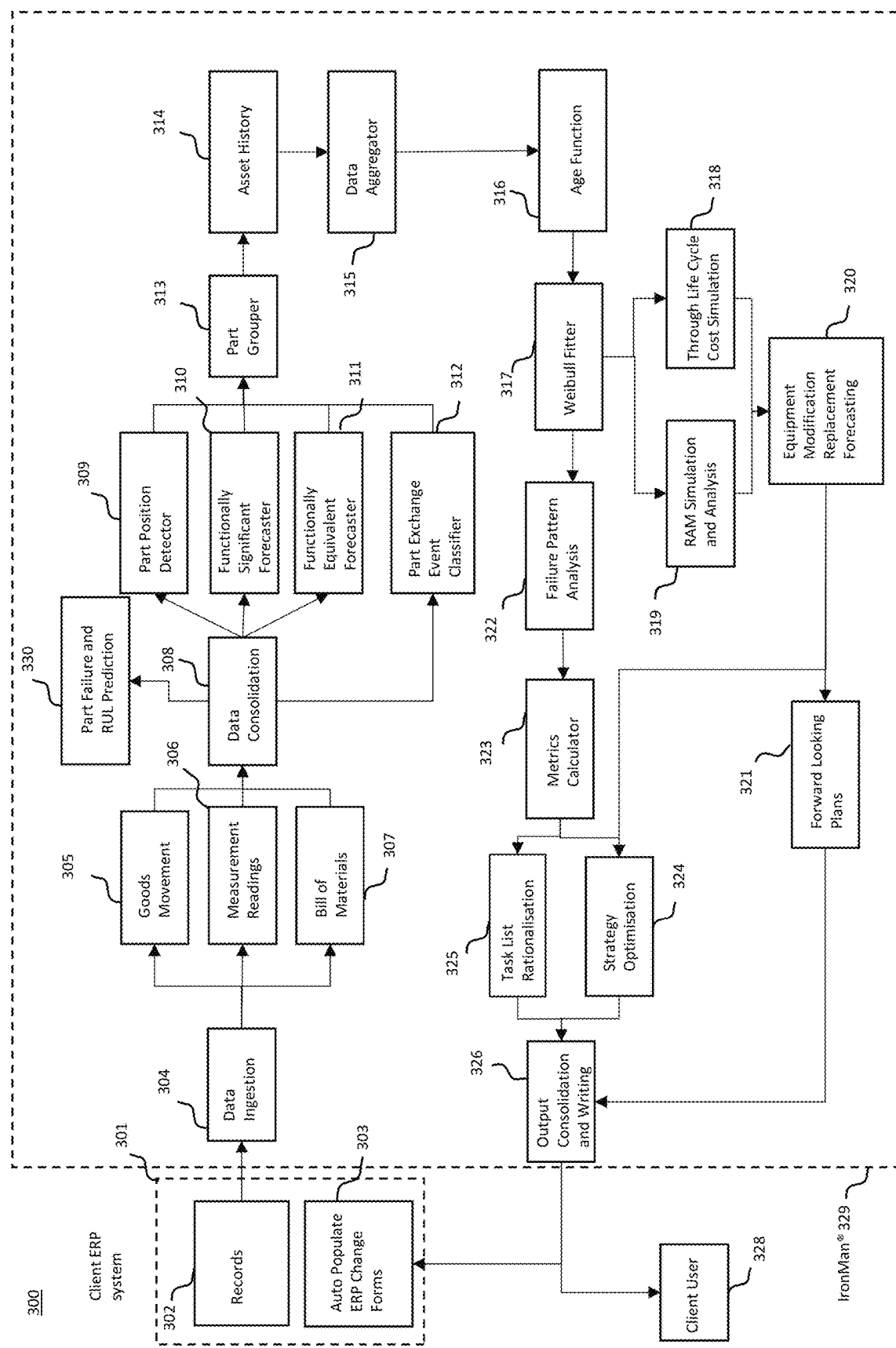
FIG. 3 shows a block diagram illustrating an asset age calculation and predictive maintenance management system in accordance with an embodiment of the invention.

FIG. 3 shows a predictive maintenance management system 300, including an asset age calculation system and maintenance strategy optimisation system 329, in accordance with an embodiment of the invention. In some embodiments of the invention, maintenance records 302 from a client-based maintenance management system or other maintenance record storage system 301 may be provided through a data ingestion process 304 into the asset age calculation system 329, also referred to as IronMan®.

In some embodiments, the maintenance records 302 may include one or more of a description of work orders, notifications, task lists 904, repair records, goods movement 305, or bill of materials 307. The goods movement 305 indicate which asset parts were withdrawn from an asset for a replacement. The bill of materials 307 indicate the detailed list of items which were used in the replacement of the parts. It should be noted, however, that the maintenance records 302 may include other information or data that may be used to calculate asset age. In some embodiments, in addition to maintenance records 302, measurement readings 306 may also be provided to the asset age calculation system 329 through the data ingestion process 304. The measurement readings 306 may be provided by sensors on the assets in a fleet and indicate the number of units (e.g. hours, miles, kilowatt hours, fuel burn or any other measurement related to duty cycle and having a predominant influence on age) an asset had been in operation at the time of the part replacement.

In some embodiments, the maintenance record data 302 may be consolidated via a data consolidation process 308 in order to perform preliminary calculations, which are required to accurately determine the age of various parts across a portfolio of assets using an age function 316. The age function is discussed in detail in later sections of this specification. In some embodiments, these data consolidation functions may include one or more of a part exchange event classification function (part exchange event classifier) 312, a part position detection function (part position detector) 309, a functional significant component (FSC) forecasting function (functional significance forecaster) 310, or a functionally equivalent item forecasting function (functional equivalent forecaster) 311.

As discussed above, maintenance record data is often incomplete and unstructured. Different users at different client sites may record notifications, work orders and task lists using different templates, procedures, and language. Often, this information is recorded as free-form unstructured text, images, audio, or video. In some embodiments, natural language processing and machine learning techniques are used to analyse and extract structured data from the unstructured maintenance records. Data stored in a structured format is inherently record oriented; it is typically stored with a predefined schema, which makes it easy to query, analyze, and integrate with other structured data sources. Unlike structured data, however, the nature of unstructured data makes it more difficult to query, search, and extract, complicating integration with other data sources. In some embodiments, the data consolidation process 308 includes training a machine learning model and using it to extract the knowledge stored in the maintenance records 302 before executing the data consolidation functions discussed above. In some embodiments, the data consolidation process 308 also includes training a machine learning to combine the extracted knowledge from the maintenance records 302 (the transactional information) with measurement readings 306 (the sensor data) to predict a likelihood of part failure.

In some embodiments, text tagging and annotation is performed on the maintenance record data 302 by identifying various terms or entities (for example, part names, positions, actions performed, or dates) recorded in the unstructured text using domain-specific ontologies. The input to the text tagging process is the unstructured text of the maintenance record data 302 and one or more ontologies; the output from the text tagging process is annotated semantic data (the extracted knowledge) that can be stored in structural data format. Text tagging and annotation consists of identifying the occurrence of terms or entities described in the ontologies in the freeform or unstructured text. Within the context of maintenance records, the common types of entities are proper nouns, part names, product codes, asset information, organizations, locations, vehicle data, times and dates, cause codes, damage codes, actions performed, and numerical data such as measurements, percentages, and monetary values etc.

In some embodiments, the text tagging and annotation process may be performed using forms and templates, which record semi-structured data. In these cases, various fields in the forms and templates define the ontologies or the structured data fields. For example, warranty claims for a failed part are generally entered into a claim form by a technician. The claim forms ask for the product code, model number, date, time, and customer ID. This information falls into the category of structured data—the information has a well-defined format and requires closed-ended answers (there are finite choices for some fields). However, templates and forms can be unreliable because the users often don't follow the standard or same procedures to record the data. Usually the form also contains a comments section where the technician can provide detailed information about the problem. This is the section where information is entered as natural language text or freeform text, and this unstructured data is key to diagnosing and understanding the problem, especially since the structured fields may not always be complete or accurate. Domain ontologies are key to extracting the information recorded in the unstructured text.

The domain ontologies containing the entities and their relationships may be prepared by domain experts or automatically learned from the unstructured data using unsupervised machine learning techniques. Using domain experts to prepare ontologies is a costly and time-consuming effort. The expert must determine the scope of the ontology based on what the ontology is going to be used for, who will use and maintain it, and what types of information needs to be extracted using the ontology. More importantly, the ontology's performance and accuracy will be limited both by the domain expert's knowledge and assumptions, and by a user's proper use of the ontology. Even in cases where a domain expert defines a good ontology, the technicians may not use the ontology when recording their notes and maintenance data. Accordingly, in order to resolve these drawbacks of domain expert based ontologies, in some embodiments of the invention, the asset management system uses unsupervised machine learning techniques to automatically generate and update ontologies for extracting structured data from the unstructured data stored in the maintenance records.

In some embodiments, a segmentation process is performed on the maintenance records to identify the starting and ending boundaries of the text snippets present in the maintenance records. The text snippets are pre-processed by performing techniques such as, but not limited to, dependency parsing, context tracing, and part-of-speech tagging. For example, context tracing and part-of-speech tagging are used to identify the salient semantic-based words and phrases in the data set of text snippets. Dependency parsing identifies the relationships between the words or phrases to determine the grammatical structure of a sentence. It is obvious to one of ordinary skill in the art that different technicians may use different words or phrases to describe the same entity or concept, and the grammar or contextual arrangement in their sentences may differ. Thus, in some embodiments of the invention, unsupervised learning on the extracted set of words and phrases is performed to find the associations, relations, and normalisations within the set of words and phrases.

Unsupervised learning essentially means that the data is not tagged with ground truth (the desired output class). Thus, the machine learning model is not trying to learn how to classify input features in an output class (such as the terms in a domain expert defined ontology) but, rather, the patterns present in the data. Unsupervised learning permits the data extraction process to efficiently extract the information present in the unstructured maintenance records and store it as a compact set of structured data (knowledge) to be used for further classification and use.

In some embodiments, a first stage machine learning model, for example an artificial neural network, is trained and used to automatically extract an ontology from the set of words and phrases in the maintenance records 302. In the training phase, the untagged set of words and phrases extracted from the maintenance records are provided as training data to one or more neural network models as inputs. The neural network models try to mimic the data they are given, and use the error in their mimicked output to correct themselves (that is, correct the weights and biases for each connected pair of neurons) by adjusting their parameters as more data is input. The error may be expressed as a low probability that erroneous output occurs, or as an unstable high energy state in the neural network. After training is completed, the neural network models output a "reference set" of concepts (ontology) that summarises the set of words and phrases extracted from the maintenance records. In other words, the neural network models self-learn the associations and relations present in the set of words and phrases, and output a reduced normalized set of concepts that capture the associations and relations present in the set of words and phrases.

In some embodiments, validation and testing of the trained first stage machine learning model is performed to ensure that the model is generalized (it is not overfitted to the training data and can provided similar performance on new data as on the training data). In some embodiments, a portion of the data is held back from the training set for validation and testing. The validation dataset is used to estimate the neural network's performance while tuning the neural network's parameters (weights and biases). The test dataset is used to give an unbiased estimate of the performance of the final tuned neural network model. It is well known that evaluating the learned neural network model using the training set would result in a biased score as the trained model is, by design, built to learn the biases in the training set. Thus, to evaluate the performance of a trained machine learning model, one needs to use data that has not been used for training.

In one embodiment, the collected data set of words and phrases extracted from the maintenance records can be divided equally between the training set and the testing set. The neural network models are trained using the training set and their performance is evaluated using the testing set. The best performing neural network model may be selected for use. The neural network model is considered to be generalized or well-trained if its performance on the testing set is within a desired range (error) of the performance on the training set. If the performance on the test set is worse than the training set (the difference in error between the training set and the testing set is greater than a predefined threshold), a two-stage validation and testing approach may be used.

In some embodiments, in a two stage validation and testing approach, the collected data set of words and phrases extracted from the maintenance records is divided between the training set, the validation set, and the testing set. The neural network models are first trained using the training set, then their parameters are adjusted to improve their generalization using the validation set, and, finally, the trained neural network models are tested using the testing set.

In some embodiments, the data set may be divided equally between the desired training, validation, or testing sets. This works well when there is a large collection of data to draw from. In cases where the collection of data samples is limited, other well known techniques, such as leave one out cross validation and testing or k-fold cross validation may be used to perform validation and testing. Cross-validation is a resampling procedure used to evaluate machine learning models on a limited data sample. The procedure has a single parameter called k that refers to the number of groups that a given data set is to be split into. As such, the procedure is often called k-fold cross-validation. When a specific value for k is chosen, such as k=10, it becomes 10-fold cross-validation.

Cross-validation is primarily used to estimate how the trained model is expected to perform in general when used to make predictions on data not used during the training of the model. The dataset is shuffled randomly and divided into a predefined number (k) of groups. The training and testing process is performed k times, with one of the groups of data being held out as the testing set for each iteration and the remaining k−1 groups being used as the training set. Each model is fitted (trained) on the training set and evaluated (tested) on the test set to determine the level of generalization of the trained models.

The purpose of k-fold cross validation is not to pick one of the trained models as the first stage machine learning model but, rather, to help determine the model structure and the parameter training process for the first stage machine learning model. For example, a neural network model can have one or more "hidden" layers of neurons between the input layer and the output layer. Further, different neural network models can be built with different numbers of neurons in the hidden layers and the output layers. In some embodiments of the invention, in the training phase, a plurality of neural network models having different numbers of layers and different numbers of neurons in each layer are generated. Each of the plurality of neural network models is trained using k-fold cross validation, resulting in a score that predicts the skill of each model in extracting the set of concepts that capture the associations and relations present in the set of words and phrases in unseen (future) data. The model (number of layers and number of neurons in each layer) having the highest predictive score is selected and then trained on the entire data set of words and phrases present in the maintenance records to generate the final first stage machine learning model for extracting the knowledge stored in the unstructured data of the maintenance records 302.

It is obvious to one of ordinary skill in the art that the machine learning model is not limited to neural networks and other machine learning models, such as a Bigram classifier, support vector machine, random forest of decision trees, or k-nearest neighbor, or a combination of different types of machine learning models may be used to extract the set of concepts that capture the associations and relations present in the maintenance record data.

In some embodiments of the invention, the trained first stage machine learning model is periodically updated, using newly collected data, by retraining the model on the old and the new data. This permits the first stage machine learning model to evolve the set of concepts, and capture new information added to the maintenance records, or changes in the way the previous information is added to the maintenance records. The changes may be due to change in technicians (different users may use different choice of words and phrases to record the information) or change in process. In some embodiments, maintenance records from different client sites may be grouped and processed using separately trained first stage machine learning models, that capture each site's local preferences and maintenance record keeping practices.

The trained first stage machine learning models are used to extract concepts from new transactional data. Some examples of the extracted concepts (outputs) from the first stage machine learning model include part names (for example, "tire", "engine", "truck bed/tray" etc.), type of action performed (for example, "replacement due to failure", "scheduled replacement without failure", "inspection" etc.), number of hours required to perform the action, part location (for example, "front-left", "front-right", "cylinder 12", etc.). The extracted concepts from maintenance records are stored as related structural data and used, together with sensor data, to predict the likelihood of failure for a part using a second stage machine learning model, discussed below.

In some embodiments of the invention, a second stage machine learning model, such as a neural network, is trained on the output (the knowledge extracted from the maintenance records 302) from the first stage machine learning model and the sensor data (measurement readings 306) to predict the likelihood of whether a particular part will fail (or not fail). In the training phase for the second stage machine learning model, the output from the first stage machine learning model and the sensor readings are provided as training data to one or more second stage neural network models as inputs. Date and time stamps are used to associate the transactional information (the output from the first stage machine learning model) with the corresponding sensor data (the measurement readings 306). Some examples of input features derived from the first stage machine learning model include part name, part location, and replacement type (corrective or predictive). Some examples of input features derived from the measurement readings 306 (the sensor data) include operational hours, fuel burn rate, temperature distributions, pressure distributions, acceleration levels, and oil condition (for example, amount of ferrous material present in the oil).

The second stage machine learning models are trained using supervised learning because the data includes ground truth information on the expected life of each part (how many hours each failed part was in operation for). Thus, each input feature vector has a target out label. The second stage machine learning models are trained until they can detect the underlying patterns and relationships between the input data and the output labels, enabling the models to yield accurate labeling results when presented with never-before-seen data.

Thus, the error functions used for unsupervised learning of the first stage machine learning models are different from the error functions used for supervised learning of the second stage machine learning models. For example, backpropagation may be used to train or more neural network models as second stage machine learning models using supervised learning. The Backpropagation algorithm looks for the minimum value of the error function in weight space using a well known technique called the delta rule or gradient descent. The weights that minimise the error function are then considered to be a solution to the learning problem. The backpropagation approach works better at finding the optimal model, without overfitting, than merely reducing the error between the target output labels and the actual output labels (from the trained model). In backpropagation, the weights and biases are repeatedly adjusted forward (increased) or backwards (decreased) for each layer of the neural network, starting with the output layer and working back to the input layer, in an effort to find the global minimum of the error function. Each backward propagation iteration uses the error from a forward computation of the neural network in a previous iteration as the starting point for the adjustments. If the error has increased between iterations, the weights are adjusted in an opposite direction (if increasing weights increases the errors, then weights are decreased).

In some embodiments, validation and testing of the trained second stage machine learning model is performed to ensure that the model is generalized (it is not overfitted to the training data and can provided similar performance on new data as on the training data). The validation and testing methods for the second stage machine learning model are similar to those of the first stage machine learning model. That is, validation and testing of the second stage machine learning model may be performed using well known techniques such as k-fold cross validation discussed in detail above. The final second stage machine learning model is selected using similar principles and processed as the final first stage machine learning model.

In some embodiments of the invention, separate second stage machine learning models may be built for each part type. In these embodiments, the set of training data is grouped by part type, and the appropriate group of data is used to train each second stage machine learning model. For example, only the training data associated with "tires" is used to train a second stage machine learning model that predicts the likelihood of tire failure when presented with new data associated with "tires".

It is obvious to one of ordinary skill in the art that the machine learning model for the second stage classifier is not limited to neural networks and other machine learning models, such as a Bigram classifier, support vector machine, random forest of decision trees, or k-nearest neighbor, or a combination of different types of machine learning models may be used to predict the probability or likelihood of part failure.

In some embodiments, the outputs from the first stage machine learning model and the second stage machine learning model are used to calculate an estimated "remaining useful life" (RUL) for the part using. RUL is utilised to predict life-span of parts with the purpose of minimising catastrophic failure events. Thus, RUL is the time remaining for a part to perform its functional capabilities before failure; in other words, the duration from the current time to an end of useful life for a part. Calculating the RUL requires combining the predicted probability or likelihood of failure for a part with time. In some embodiments, a third machine learning model is trained, using similar methodologies as the other machine learning models described herein, to compute the RUL.

In some embodiments, the third machine learning model uses the age of the part (how long since it was last changed—obtained using the first stage machine learning model), duty cycle (obtained using sensor data 306), and the predicted likelihood of failure (obtained from the second stage machine learning model) as inputs to the training data. Historical "run-to-failure" data (obtained from both the sensor data 306 and the first stage machine learning model) is used as ground truth (the desired output) for the training data. In some embodiments, the training data is processed using analytic models to account for domain knowledge or level of acceptable risk. For example, consider a case where the outputs from the first stage machine learning model show that 20% of the assets in the fleet are likely to undergo engine failure at 20,000 operational hours when the engines are operated at an average oil temperature of 90° C. Suppose that the second stage machine learning model applied to new engine data obtained for an asset, which has been operating for 18,000 operational hours at an average oil temperature of 95° C., then predicts that the likelihood of failure has increased to 30% over the next 2,000 hours. The analytical model may take the revised predicted failure probability (30%) to reduce the RUL for the truck from 2,000 hours (20,000 average hours-18,000 operating hours) to 500 hours.

Similar to the first stage machine learning model and the second stage machine learning model, the third machine learning model is trained using a validation approach, such as k-fold cross validation, to prevent overfitting and promote generalization. Further, different types of machine learning models, such as neural networks, k-nearest neighbors, support vector machines, etc. may be used for the third machine learning model.

In some embodiments of the invention, a part failure and remaining useful life determination module 300 applies the trained machine learning models to new transactional and sensor data to predict the probability of part failure and/or the remaining useful life of the part.

FIG. 27 shows a flowchart of a method 2700 of performing machine learning based information fusion to predict part failure likelihood of a plurality of parts in one or more assets of a portfolio. In step 2710, historical transactional data pertaining to replacement of, and historical sensor data pertaining to duty cycle of, parts is received. In step 2720, a first stage machine learning model is trained using the historical transactional data as training data for the first machine learning model. The trained first stage machine learning model outputs a plurality of concepts corresponding to the information present in the unstructured text in the transactional data. In step 2730, a second stage machine learning model is trained using the sensor data and the plurality of concepts extracted as output from the first stage machine learning model. The second stage machine learning model outputs predicted part failure likelihood of the parts. In step 2740, a third machine learning model is trained using age of the parts, extracted from the transactional data, the duty cycle obtained from the sensor data, features corresponding to an analytical model that correlates probability of failure with remaining useful life under varying operating conditions. The third machine learning model outputs predicted remaining useful life of the parts.

In step 2750, new transactional data pertaining to replacement of, and new sensor data pertaining to duty cycle of, parts is received. In step 2760, the trained first stage machine learning model is used to output a plurality of concepts corresponding to the information present in the unstructured text in the new transactional data. In step 2770, the trained second stage machine learning model is used to output predicted part failure likelihood of the parts in the new transaction and sensor data. In step 2780, the trained third machine learning model is used to predict the remaining useful life of the parts in the new transactional and sensor data.

In some embodiments, training steps 2720, 2730, and 2740 are periodically repeated using the nee transactional data and the new sensor data, received in step 2750, to update the trained first stage machine learning model, the trained second stage machine learning model, and the trained third machine learning model.

In some embodiments of the invention, the system automatically constructs a hierarchy of parts and assets in a portfolio, in the form of an ontology, from the asset level through to sub-assemblies and then to functionally significant components (FSC), based on the knowledge obtained from the first stage machine learning model. This ontology is used for part allocation and by semantic rules to associate the position of physical parts with activity such as financial spend, preventative and corrective maintenance. When the system onboards a new customer with new asset types, or existing customers with new asset types, the system automates the construction of a physical dependency hierarchy of asset to systems, to assemblies or subsystems down to functionally significant components. FSCs may include those parts that suffer failure modes where the impact has safety, operational or economic impacts, that may also be subject of preventative maintenance that are identified from work order data. The system may automatically adjust FSC components as new data is received, splitting current FSCs to lower components or aggregating to higher components to isolate failure modes or set the most appropriate level to attach preventative maintenance. The hierarchy is modelled as an ontology as this affords a level of semantic rules to be associated which may assist in the identification of the position of parts where an asset may have more than one equivalent part fitted in different locations.

In some embodiments, the part exchange event classification function 312 classifies parts based on whether the parts were replaced as part of a planned or an unplanned maintenance event, including whether the exchange event was preventative or corrective in action, based on the knowledge obtained from the first stage machine learning model. In some embodiments, the part position detection function 309 determines, based on information included in, for example, the bill of materials 307, goods movement 305, or the description of the work order, the positions of the parts that were replaced. For example, the part exchange event classifier 312 may identify an event where two wheels were replaced on a six-wheel truck and the parts position detection function 309 may identify which two of the six wheels were replaced. In some embodiments, the part position detector 309 determines the replaced part position(s) based on the descriptions in notifications contained in repair information 502 and historical replacement information.

In some embodiments, the functional significance forecasting function 310 determines whether the replaced part is significant (from the perspective of the asset) based on whether the asset can continue operating despite the failure of the part, based on the knowledge obtained from the first stage machine learning model. For example, an oil leak may not prevent a vehicle from operating but a steering arm failure may prevent the vehicle from operating. In some embodiments, the functionally equivalent forecasting function 311 reconciles work orders 302 where equivalent parts are sourced from different manufacturers and, therefore, have different codes. It should be noted that, equivalent parts from a same manufacturer may also have different codes. The functionally equivalent forecaster 311 prevents functionally equivalent parts from being grouped separately in a part grouping process (part grouper) 313, which could result in inaccurate asset part age calculations and incorrect part replacement schedules and strategies.

The data consolidation functions connect and enrich the maintenance event information stored in the maintenance records 302 so that all the replacement events for a given part type can be aggregated by the data aggregator 315 prior to calculation of the distribution of the asset part age by the age calculation function 316. This process is not straightforward because of the complexity of an asset and, therefore, the number of interconnected parts to keep track of in separate maintenance records 302. Moreover, this task is complicated by the fact that the results of the age calculation function 316 only make sense if it is calculated for a part type by its position on the asset. Determining the position of a replaced part may be straightforward when a single part is fitted to an asset. However, when there are many instances of a single part type fitted to an asset, it is often difficult to determine the position because work orders 302 may mention the number of replaced parts but not their position.

After one or more of the data consolidation functions 309, 310, 311, 312 have been applied to the data, the part replacement events, as captured in the knowledge obtained from the first stage machine learning model, are grouped in the part grouping process 313 to form a complete asset history 314 of parts within an asset, which is then aggregated via the data aggregator 315 to the entire portfolio of assets. While the age of each asset in a portfolio may be determined via the measurement readings 306, the age of each part that can be replaced in an asset needs to be deduced based on the dates of historical replacements, which will only be accurate if the part positions have been accurately determined by the part position detection function 309. In some embodiments of the invention, information on a current age of unreplaced parts may also be obtained for more accurately determining the status of parts in a portfolio. In some embodiments, information on the unreplaced parts is included in the asset history 314.

Figure 13:
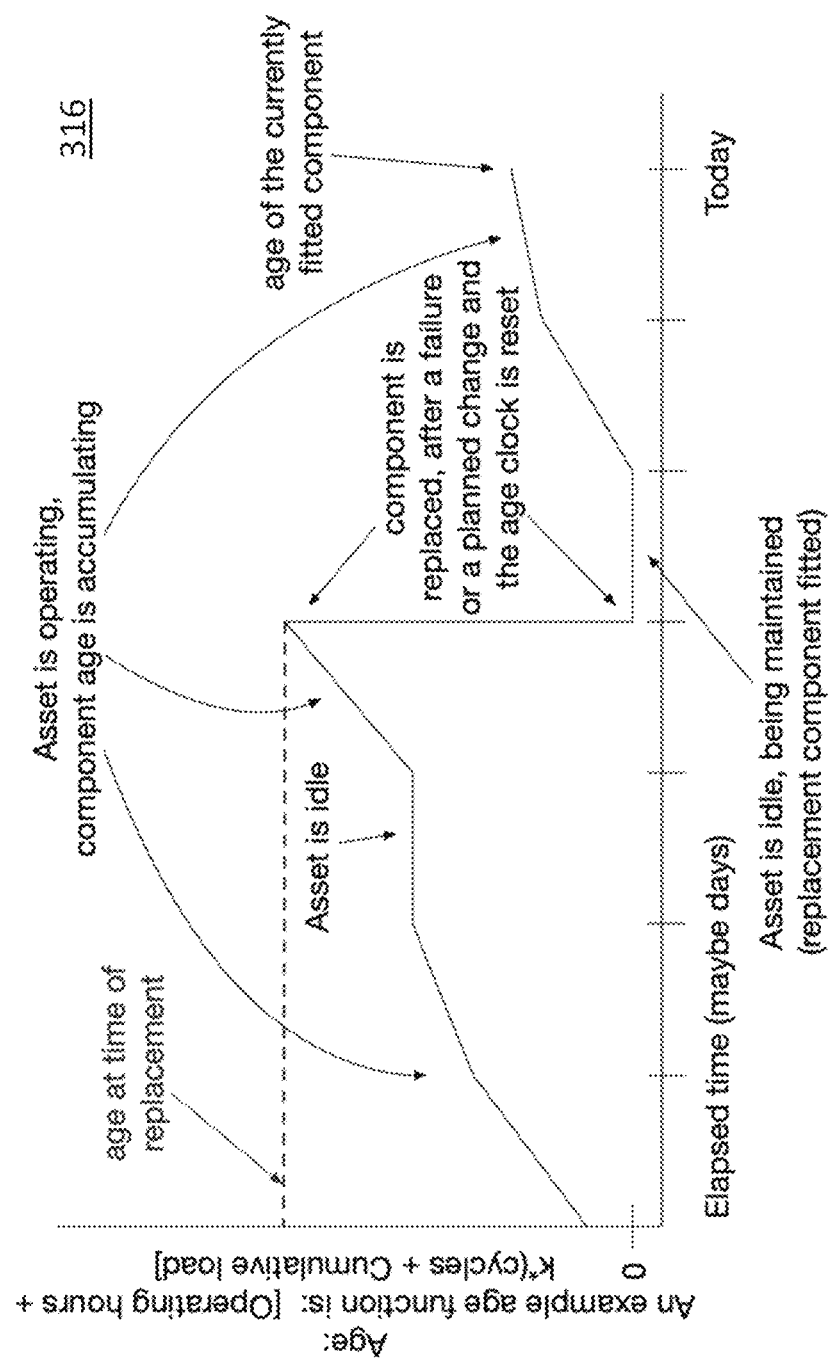
FIG. 13 shows an example of an age function associated with block 316 for a part in accordance with an embodiment of the invention.

In some embodiments of the invention, the age calculation function 316 calculates a distribution of the age at replacement of each part, by part type, across the portfolio of operating assets collected by the data aggregator 315. In some embodiments, the age calculation function 316 first generates an age profile for each part. FIG. 13 shows an example of an age profile for a part. As the asset is used, the age of the part increases. When the asset is idle, it is possible that the part may not accrue any age, but not in all cases. The age of the part is reset to zero when the part is replaced. In some embodiments, the age calculation function generates an age profile for each part of an asset in a portfolio. The age profile also shows a current age for the part.

In some embodiments of the invention, the age calculation function 316 further generates a distribution of the age at replacement of all parts of a same part type in the asset. In some embodiments of the invention, the same part type could refer to a broad category of parts, such as a wheel on a truck. In some embodiments of the invention, the same part type could refer to a narrower category of parts, such as the front left wheel on a truck. In some embodiments of the invention, the same part type could refer to an even narrower category of parts, such as a front left wheel on a truck driven on unpaved roads. In some embodiments of the invention, the system permits the "part type" to be defined broadly or narrowly to accommodate different use cases for similar parts or assets in a portfolio.

Figure 14A:
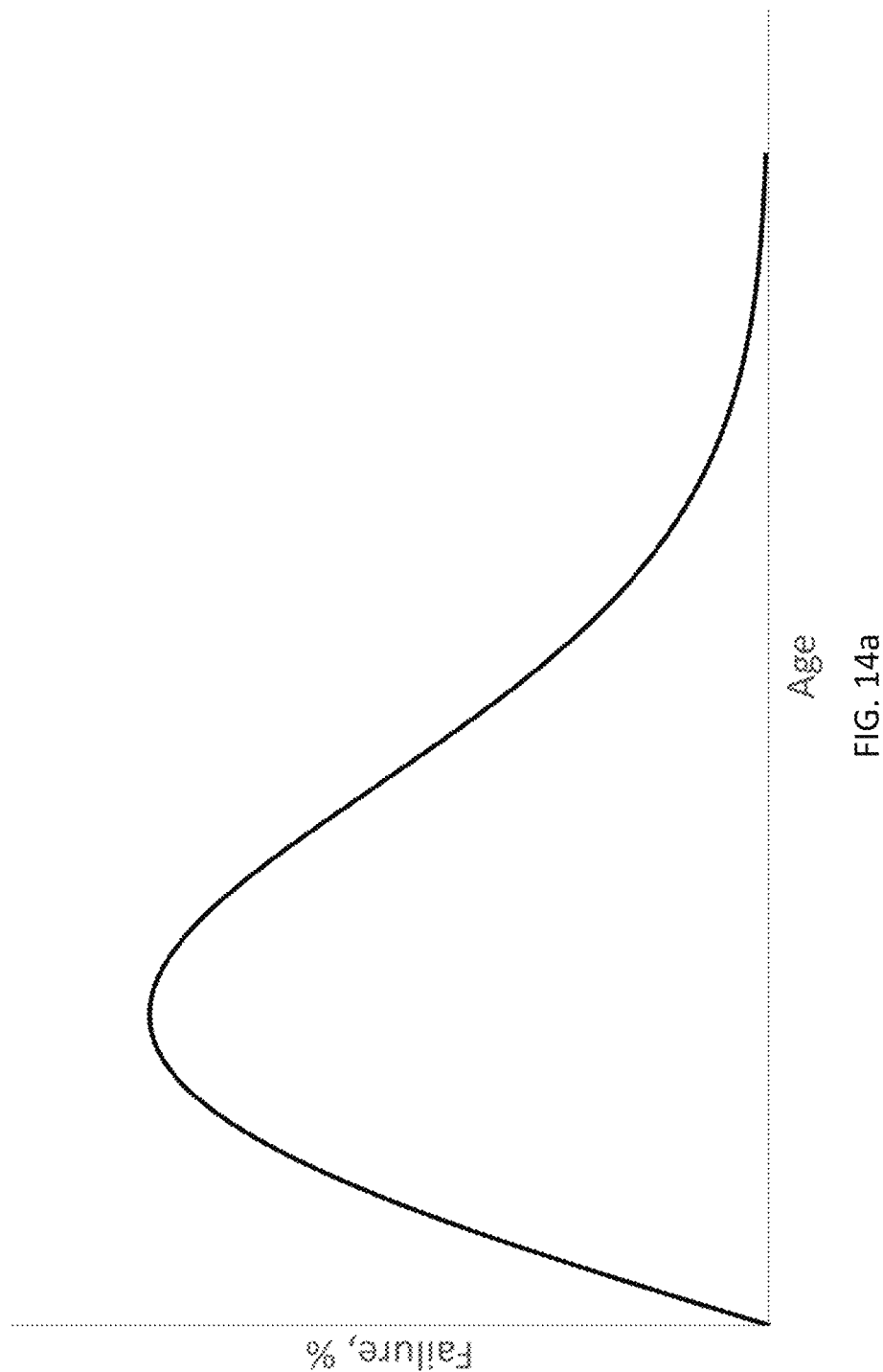

In some embodiments, a fitter, such as the Weibull fitter 317, may be applied to the distribution of age at replacement of all parts of a defined part type, obtained from the age calculation function 316. FIGS. 14a and 14b show examples of fitting a Weibull probability distribution function or a Weibull cumulative distribution function to the distribution of age at replacement of all parts, respectively. The calibrated Weibull function from the fitter 317 is then used to determine the failure pattern of the part using a failure pattern analysis module 322. It is obvious to one skilled in the art that order probabilistic or statistical functions may be used to generate a fit to the distribution of age at replacement of all parts. Failure metrics may be calculated using a metrics calculator 323, based on the failure pattern of the part. It should be noted that other functions instead of a Weibull function may be used generate the distribution 317 of age at replacement of a part type.

In some embodiments of the invention, the Weibull fitting may produce one or more of three parameters, shape, scale and location, that may be used to construct probability and cumulative density functions associated with failure patterns. In some cases, where multiple failure patterns for the same part are identified, IronMan® may construct multiple sets of parameters, each with their own failure pattern. The shape parameter enables the identification of three fundamental failure patterns; premature failure, random failure, and wear out failure. In some embodiments, the system provides recommendations for maintenance interventions associated with the failure patterns. For example, in the case of premature failure, any previously determined replacement or maintenance strategy is stopped, a root cause analysis (RCA) may be performed, and on-condition maintenance may be considered if it is practical to contain the unexpected premature failures until the cause has been eliminated. In the case of random failure, an on-condition maintenance process is applied if it is practical and cost effective. In the case of wear out failure, both scheduled replacement and on condition maintenance are applicable, although scheduled replacement may be more advantageous when the shape parameter strongly indicates wear out failure pattern.

In some embodiments, the failure metrics calculated by the metrics calculator 323 may be used to determine optimal replacement strategies using a strategy optimisation process 324 for each part type. In some embodiments, a task list rationalization process 325 may rationalise task lists 904 so that each part is optimally stocked and replaced cost-effectively. The insights and recommendations from the strategy optimisation process 324 and the task list rationalization process 325 may be consolidated by an output consolidation and writing function 326 to, for example, update forms stored in the client's maintenance management system 303. In some embodiments, the insights and recommendations generated by the output consolidation function 326 may be presented to a client user 328 via a user interface.

In some embodiments, the calibrated Weibull function 317 may be used to generate a Reliability, Availability and Maintainability (RAM) simulation 319, which effectively provides whole system availability and downtime simulations at asset or fleet levels. By adding cost elements to the RAM simulation 319 and Weibull function 317, a through life cycle cost simulation 318 may forecast future costs based on existing maintenance processes and propose alternative outcomes via what if analyses. The outputs from the RAM simulation and analysis 319 and the through life cycle cost simulation 318 can be used to generate future part replacement strategies (forward-looking plans) 321 using an equipment modification and replacement forecasting process 320. In some embodiments, the strategy optimisation process 324 can utilise the information generated by the equipment modification and replacement forecasting process 320. In some embodiments, the forward-looking plans 321 can supplement or augment the insights and recommendations generated by the output consolidation function 326.

The IronMan® system 329 is an exemplar asset part age calculation and predictive maintenance management system that includes an implementation of the processes and functions 304-326 shown in FIG. 3.

FIG. 4 shows a method 400 for consolidating maintenance records and automating the calculation of the age function according to some embodiments of the invention. In some embodiments, in step 405, maintenance record data 302 is ingested using the data ingestion process 304. In step 410, work order data on goods movement 305 or bill of materials 307 is extracted from the maintenance record data 302. In step 415, measurement data 306 is extracted from the maintenance record data 302. The extracted data is then analysed using data consolidation functions. The analysis and data consolidation step 430 performs the data consolidation process 308 using various data consolidation functions 309, 310, 311, 312, and groups parts using the part grouping process 313 to generate asset history 314. The data is then aggregated across the portfolio in step 425 using the data aggregator 315. In step 430, the age at replacement distribution of each part type across the portfolio is calculated using the age calculation function 316. In step 435, failure metrics are derived by performing a failure pattern analysis module 322 and metrics calculation 323 on the derived age at replacement distributions. In step 440, optimal maintenance strategies are calculated, based at least on the derived failure metrics, using the strategy optimisation function 324 and the task list rationalization function 325. In step 445, maintenance process recommendations are generated.

Figure 5:
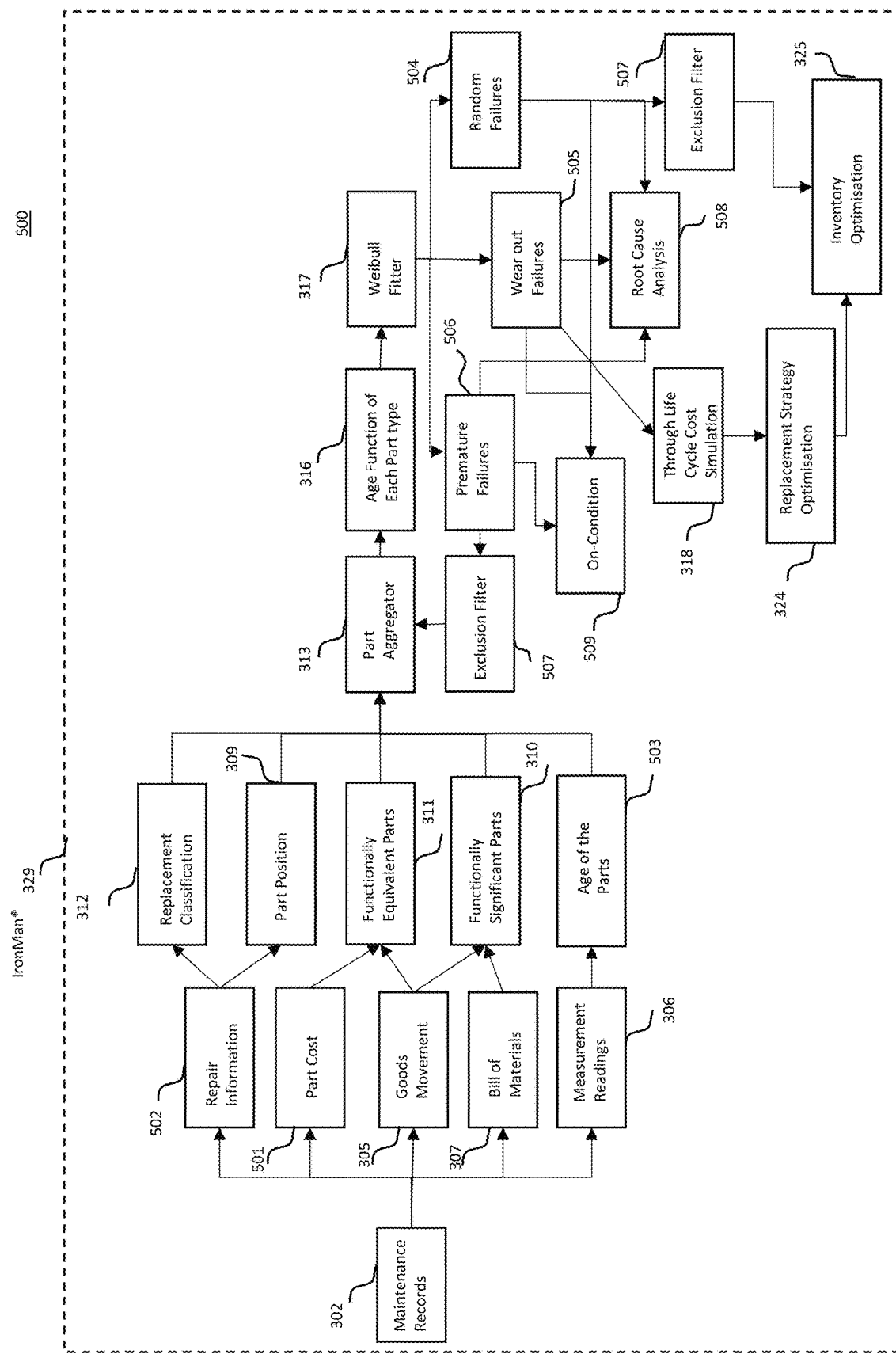
FIG. 5 shows a block diagram illustrating an asset age calculation and failure analysis system in accordance with an embodiment of the invention.

FIG. 5 shows a block diagram of a data consolidation and failure analysis system 500, as applied to a single work order 302, in accordance with an embodiment of the invention. In some embodiments, the age calculation function 316 is initialised using information from the client maintenance management system or other maintenance database system 301, which contains all the historical maintenance or work order records 302. In this regard, the system 500 provides an exemplar overview of the analysis which is conducted by IronMan® system 329 at the level of a single work order 302. The detection of the replaced part by the part position detector 309 and the classification of the replacement by the part exchange event classifier 312 as planned or unplanned may be derived using natural language processing algorithms on notifications contained in repair information 502, which may be recorded as plain text by frontline workers performing the repair. In some embodiments, the functionally equivalent parts may be predicted (using forecaster 311) based on the goods movement 305 as well as the cost of the parts 501 (since the cost of functionally equivalent parts often tends to be similar).

In some embodiments, functionally significant parts (using function 310) are determined from the goods movements 305 and the bill of materials 307, which excludes, for example, consumables from the age calculation function 316 analysis. In some embodiments, age 503 of the part replaced in the work order 302 is calculated using the measurement readings 306. If the measurement readings do not include the operating hours of the part, which are often inputted manually, the part age 503 may be estimated based on the age of the asset and the date of the last replacement. In some embodiments, measurement readings for one or more parts could be provided by sensors, whose values would be included in the analysis. In some embodiments, the aggregator 313 may aggregate all the replacement ages 503 of the functionally equivalent parts across a portfolio of assets in order to generate their respective age calculation functions 316. In some embodiments of the invention, a Weibull distribution 317 is then fitted to the age function 316 to determine the failure pattern.

Premature failures 506, random failures 504, and wear out failures 505 may each undergo a root cause analysis 508 to determine the cause of the failure, as well as an on-condition analysis 509 to corroborate the investigation performed by the root cause analysis 508. These analyses help determine if the premature failures 506 and the random failures 504 have been diagnosed correctly, especially if they are not expected are predicted to be premature or random. However, in some embodiments, if the failures are confirmed as premature or random, they may be excluded from future calculations by an exclusion filter 507 because they require a different analysis. Often, maintenance processes are not effective for random failures 504 and premature failures 506 that might be due to the manufacturer 609 or the maintenance team who fitted the part. The results of the exclusion filter 507 help inform inventory requirements used by the task list rationalization process 325. For wear out failures 505, the root cause analysis 508 may assist in recommending optimal time-based replacement strategies using the strategy optimisation process 324.

In some embodiments, the wear out failures 505 may also be used to simulate future maintenance and operating costs with the through life cycle cost simulation 318, which also impacts the optimal replacement strategy process 324. The optimised replacement strategy process 324, in conjunction with the identification of random failure parts 507, determines the optimal inventory requirements and generates insights and recommendations for the user. In this regard, the predictive maintenance management system 300 generates a replacement strategy that aims to increase asset availability for profitable utilisation, and increase reliability to reduce disruption, while decreasing the cost of ownership by optimising maintenance and replacement of parts.

FIG. 6 shows a method 600 for a decision-making process that guides the analysis of a part failure, according to some aspects of the invention. The flowchart of method 600 illustrates how warranty claims, part failures, and maintenance actions may be coordinated, according to some embodiments of the invention. In step 601, a part failure is recorded. In step 602, it is determined whether the part is eligible for a warranty claim. If yes, then the original equipment manufacturer (OEM) is contacted in step 620 to make the warranty claim. If the part is not eligible for warranty (No in step 602), an initial analysis to determine the failure pattern is performed in step 603. In some embodiments, the failure pattern in step 603 is determined by performing the failure pattern analysis process 322. If the failure pattern is determined to be random in step 603, then it may not impact planning of replacement strategies. In some embodiments, in step 615, the inventory is optimised to have a sufficient number of replacement parts based on historical failures as determined by the task list rationalization process 325. If the part failure is determined in step 603 to be due to wear out, a functionally significant part process 310 is performed in step 604 to determine if the asset can still be operated. If the asset cannot be operated (No in step 604), then a replacement is immediately scheduled in step 606. If the asset can be operated (Yes in step 604), then, in step 605, it is determined whether a planned replacement has already been scheduled. If the replacement has not been planned (No in step 605), then a replacement is scheduled in step 606. Otherwise (Yes in step 605), the replacement clocks for the part are reset in step 607 so that the parts do not get replaced prematurely as part of scheduled maintenance plans.

In step 608, a root cause analysis process 508 may be conducted once the replacement has been scheduled. In some embodiments, the root cause analysis process 508 may be the done if the failure pattern is identified as premature in step 603 or if the failure's frequency and impact is determined to be significant in step 603. In step 609, it is determined whether the root cause analysis 508 leads to any conclusions that may impact the maintenance schedule or the failure forecast. In step 610, findings from the root cause analyses process 508, conducted in step 608, are implemented. In some embodiments, the OEM may be contacted in step 620 in case of a potential warranty claim.

Figure 7:
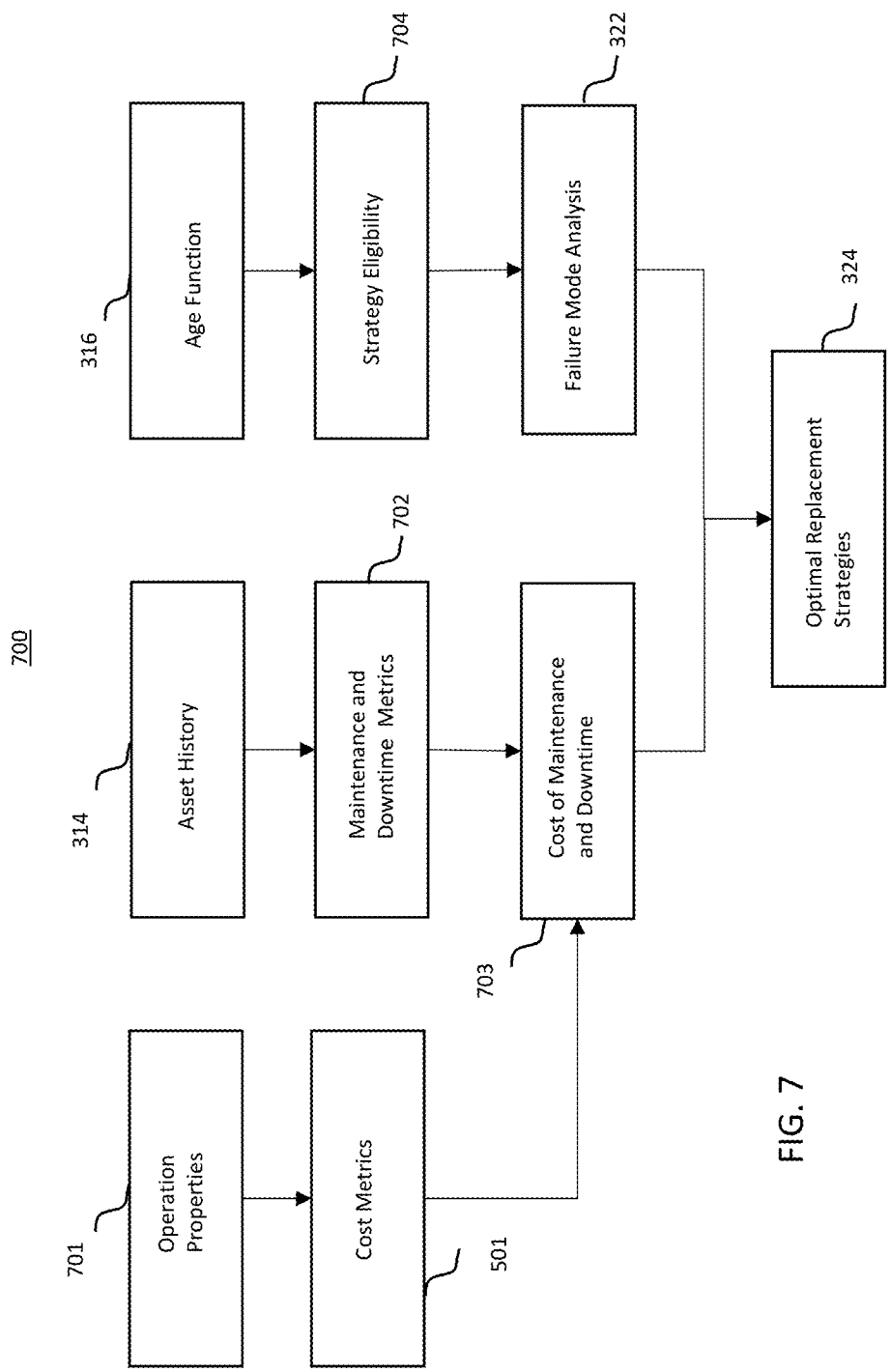
FIG. 7 shows a block diagram illustrating an example of the predictive maintenance management system's optimal replacement strategy capability in accordance with an embodiment of the invention.

FIG. 7 shows a block diagram of a system for determining optimal replacement strategies based on the generated age at replacement functions, according to some embodiments of the invention. The predictive maintenance management system 300, such as the IronMan® system 329, extracts, integrates and processes transactional data and sensor data to produce a part replacement history for each part on the asset. In some embodiments, the transactional data may be provided by maintenance records 302 and the sensor data may be provided by measurement readings 306. In some embodiments, maintenance records 302 may include information regarding what maintenance events occurred, or will occur, such as the goods movements 305 and repair information 502. The maintenance records 302 may also provide context for the maintenance events (for example, if an engine failed, then a new engine part may be ordered, along with a description of the fault such as oil leaking from the number five cylinder head, or bearing failure at number 10 connecting rod). In some embodiments, measurement readings 306 may include the duty cycle of the part derived from sensor data onboard the asset (for example, the fuel burn rate may be calculated using the pulse width from each fuel injector supplying fuel to an engine, or the time that the engine is running may be calculated using the engine speed sensor against a reference clock in an electronic control unit on the asset). The maintenance records 302 and measurement readings 306 provide complementary information (maintenance events and context from the maintenance records 302 and duty cycle information from the readings 306), which is integrated to obtain the age function 316.

In some embodiments of the invention, the predictive maintenance management system 300 assesses the current part replacement and maintenance strategy against the generated part replacement history to determine optimal replacement strategies. The determination of part age at replacement using the age calculation function 316 is important to generate the optimal replacement strategies in the strategy optimisation process 324. The failure pattern analysis module 322 in the metrics calculator 323 utilises the age at replacement of a part across a portfolio of assets to derive the failure metrics, which are required to determine if that part type is eligible for a planned maintenance strategy 704. If the part type is eligible for a planned maintenance strategy, then the failure pattern analysis module 322 determines the potential replacement times. The optimisation of the replacement times in the strategy optimisation process 324 may be based on an awareness of the cost of maintenance and downtime 703. In some embodiments, the cost of maintenance and down time 703 may be determined from the site's operation properties 701 and cost metrics 501, as well as the maintenance downtime metrics 702, which are derived from the asset history 314.

FIG. 15 shows an exemplar graphical user interface 1500 for displaying the determined optimal replacement strategies, according to some embodiments of the invention. In some embodiments of the invention, a user can select and view one or more assets they are responsible for. In some embodiments of the invention, a first screen of the user interface 1500, shown in FIG. 15, displays a list of parts for a particular asset (for example, a Trial Truck). In some embodiments, the displayed list of parts includes one or more of a material number 1510, a part description 1520, a part cost 1530, a current maintenance strategy 1540, a recommended maintenance strategy 1550, and user actions 1560.

The material number 1510 is a unique identifier for each part, which may be set by the user, and available in the maintenance records 302, or set by the IronMan® system 300. The part description 1520 describes the part type and may include other information such as the OEM name and OEM part number. The part cost 1530 may include the cost of the part from a particular supplier or an average cost of the part over a period of time or through multiple suppliers. The current maintenance strategy 1540 reflects the current part replacement and maintenance strategy for each part type within the system. The recommended maintenance strategy 1550 reflects the optimal part replacement and maintenance strategy determined by the predictive maintenance management system 300 for each part type within the system. A user can use the graphical user interface 1500 to take several actions for each part type.

Figure 16:
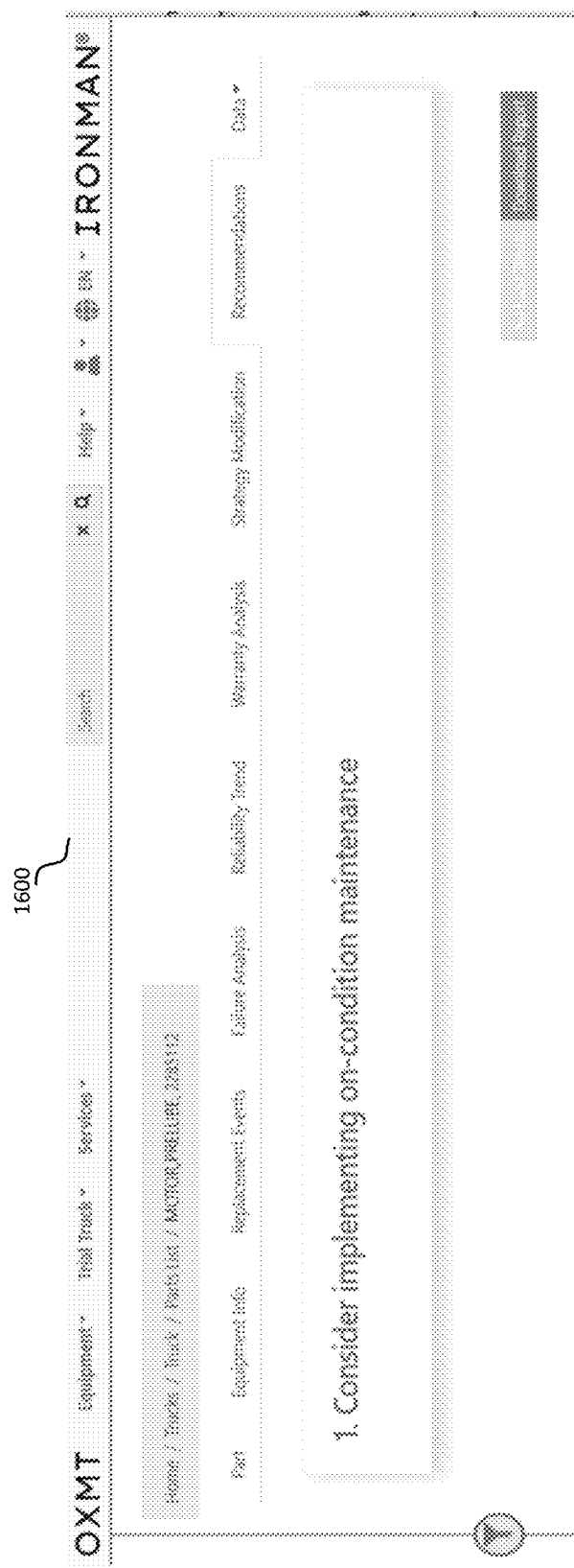
FIG. 16 shows an example of a report generation screen of the graphical user interface for the predictive maintenance management system, in accordance with an embodiment of the invention.

In some embodiments, the graphical user interface 1500 may use the part criticality score 1205, information from the Weibull fitter 317, and functionally significant parts 310, to determine an order of displaying the parts in the table shown in the graphical user interface 1500. This functionality assists the user in prioritisation of tasks for action within the graphical user interface 1500. For example, the system 300 may first identify all parts with a change recommendation for the maintenance strategy. Then, among these identified parts, the system may further identify critical or functionally significant parts and associate them with higher priority for display in the top rows of the table. Often, an asset may have thousands of parts, and using information such as part criticality score 1205, information from the Weibull fitter 317, and functionally significant parts 310 can significantly improve ease of use of the graphical user interface. The user can filter, search and sort the list of parts that have recommendations for changing maintenance strategies. The user can also select a single part to view a more detailed list of that parts recommendations (each part may have more than one recommendation), as shown in FIG. 16. The data in the table can be exported for offline analysis. The system 300 can also generate load sheets that can be transmitted to client worksites 1101 to update the maintenance strategies stored in local or central maintenance transactional systems. The report can be fed back to a transactional system (for example, the maintenance record storage system 301) to update its master data, including task lists 904.

FIG. 16 shows an example of a report generation screen 1600 of the user interface 1500, according to some embodiments of the invention. The report generation screen 1600 permits the user to generate reports showing how recommendations are derived from part event history to provide technical justification and audit trail for downstream decisions.

In some embodiments, the user actions 1560 include approve 1561, modify 1562, and investigate 1563. If the user agrees with the recommended part replacement and maintenance strategy 1550, they can accept it by clicking the approve button 1561. For example, as shown in FIG. 15, the current maintenance strategy 1540 for the first part on the displayed list, Material Number 88891519, is to replace the part when it fails. The recommended maintenance strategy 1550 from the predictive maintenance management system 300 is to change this part at 13,000 hours of use. If the user finds this change acceptable, they can click the approve button 1561 for this part and the predictive maintenance management system 300 can automatically change the current maintenance strategy for this part from "run to failure" to "replace at 13,000 hours". In some embodiments, selecting the approve button 1561 displays the report generation screen 1600 for the selected part.

Figure 17:
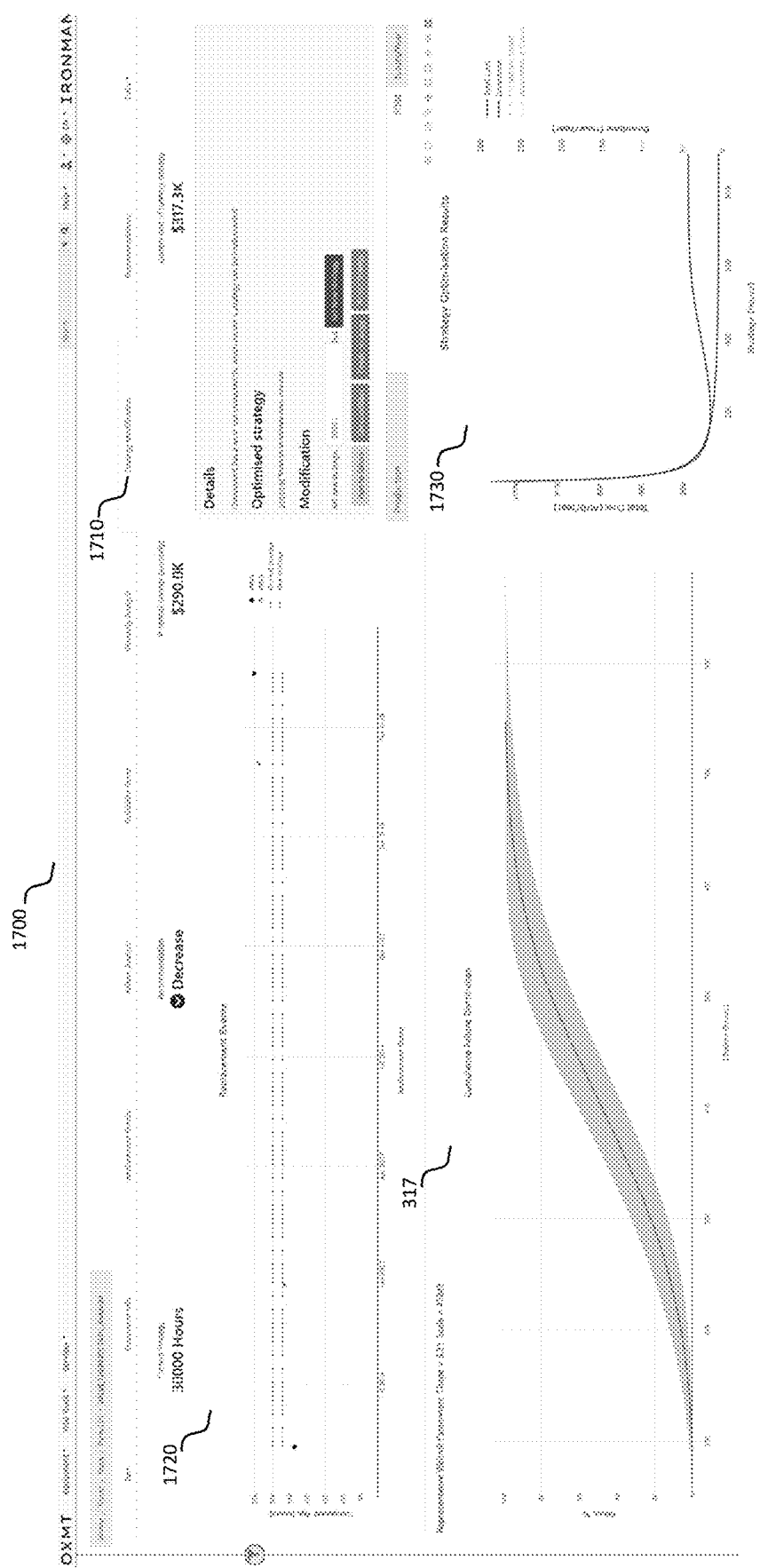
FIG. 17 shows an example of a maintenance strategy modification screen of the graphical user interface for the predictive maintenance management system in accordance with an embodiment of the invention.

Alternately, the user can click the modify button 1562 or the investigate button 1563 to potentially change the system's part replacement and maintenance recommendation. FIG. 17 shows an example of a maintenance strategy modification screen 1700 of the user interface 1500, according to some embodiments of the invention. The maintenance strategy modification screen 1700 includes, in some embodiments, a strategy modification interface 1710, information on replacement events 1720, the distribution 317 of age at replacement, and strategy optimisation results (cost function) 1730. In some embodiments, the strategy modification interface 1710 includes details describing characteristics of the failure patterns and justification for the recommended part replacement and maintenance strategy 1550, information on the recommended part replacement and maintenance strategy 1550, and various options for the user to modify the recommended part replacement and maintenance strategy 1550. For example, if the recommended part replacement and maintenance strategy 1550 is to replace the part at 20,000 hours, based on an estimated downtime cost 1730, the user may modify the recommendation to replace the part at 30,000 hours instead of the recommended 20,000 hours, or select a different replacement strategy such as run-to-failure or on-condition maintenance.

In some embodiments, the graphical user interface permits the user to modify the replacement events 1720 that are to be used for the generation of the distribution 317, through a number of mechanisms such as outlier detection or a user selectable date range. This interactive filtering of the timeline of replacement events 1720 permits the user to execute a what-if functionality that can be used to confirm the value opportunity of any root cause analysis. For example, in the replacement events 1720 shown in the example of FIG. 17, the user may choose to exclude older events, before April 2017, from the analysis. In response, the system 300 would automatically rerun the age calculation function to generate a new theoretical Weibull cumulative distribution to exclude the older events, and rerun the strategy optimisation results 1730. Thus, a user can easily simulate the effects of various filtering criteria. Another what-if functionality may be provided by permitting the user to modify some inputs to the strategy optimisation 1730, such as the cost of downtime 703 or the time taken to complete work, maintenance, and downtime metrics 702. Using different inputs or factors would change the associated curves and the optimal strategy in terms of cost. The user may base their decision to modify the recommended part replacement and maintenance strategy 1550 based on one or more of information on replacement events 1720, the distribution 317 of age at replacement, and strategy optimisation results 1730. The information on replacement events 1720 shows when the historical part replacements were performed, the current strategy, the new strategy, and when the predicted part replacement will be performed under the new strategy. In some embodiments, the information on replacement events 1720 is automatically updated to show the new strategy and the predicted maintenance events when the user modifies the new strategy (the recommended part replacement and maintenance strategy 1550), using the strategy modification interface 1710. In some embodiments, the distribution 317 of age at replacement is fitted to a Weibull function that shows, in addition to the cumulative failure distribution of the part over the lifetime of the part, a confidence measure in the calculated distribution shown by the shaded interval around the predicted function curve 317. The strategy optimisation results 1730 show optimisation results for the selected part based on factors such as replacement part cost and downtime.

There may be multiple factors that can contribute to a user's decision for modifying the recommended part replacement and maintenance strategy 1550. In some embodiments, the recommended part replacement and maintenance strategy 1550 may be based on the minimum total cost predicted by the strategy optimisation results 1730. However, a wider confidence range (width of the shaded region around the curve 317) may correlate with sparseness of historical part replacement data. Human factors, such as availability of maintenance personnel to perform part replacements, safety concerns, or legal regulations may also impact the user's decision to modify the recommended part replacement and maintenance strategy 1550.

In some embodiments of the invention, the user can test different optimisation factors (costs and times) to find the appropriate maintenance strategy for the part based on their own appetite for risk. In some embodiments, after the user modifies and accepts the recommended part replacement and maintenance strategy 1550, the report generation screen 1600 for the selected part is displayed.

Figure 18:
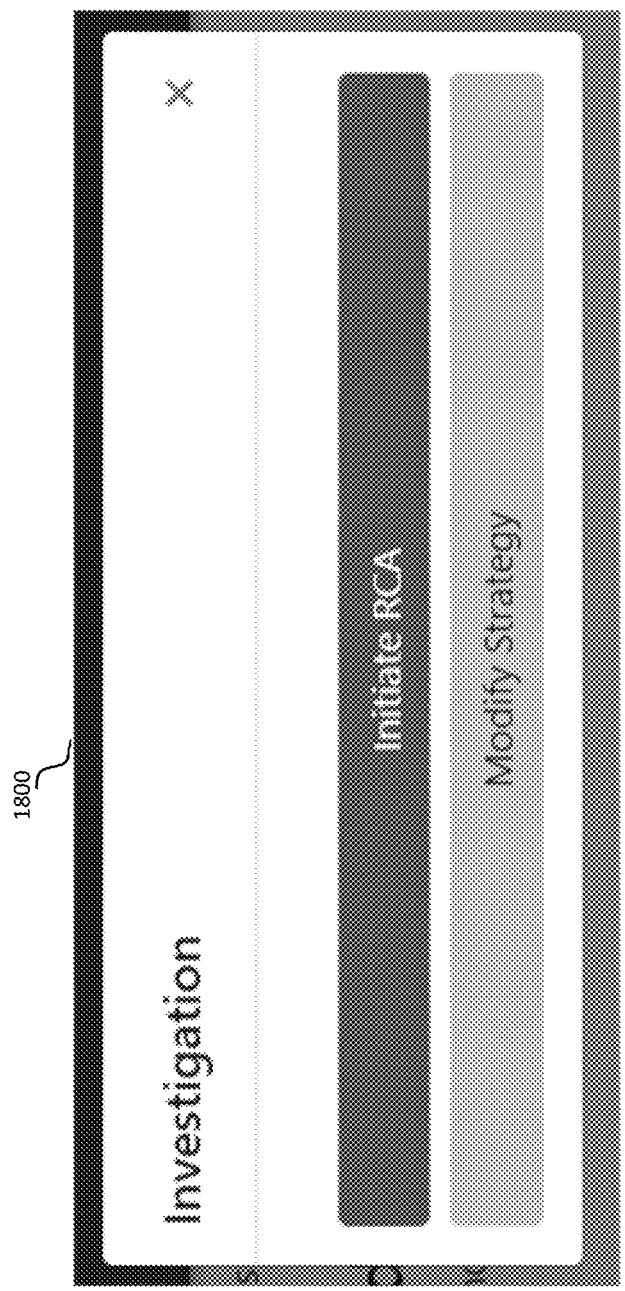
FIG. 18 shows an example of an investigation options screen of the graphical user interface for the predictive maintenance management system in accordance with an embodiment of the invention.

Returning to FIG. 15, in some embodiments, the user may select the investigate button 1563 to initiate a root cause analysis (RCA) prior to approving or modifying the recommended maintenance strategy 1550. In some embodiments, upon selecting the investigate button 1563, the graphical user interface displays the investigations options screen 1800 shown in FIG. 18. In some embodiments, the investigation options screen 1800 includes a button to initial the RCA and a button to modify the current or recommended strategy using the maintenance strategy modification screen 1700. In some embodiments, the investigation options screen 1800 is displayed in the form of a pop-up window.

Figure 19:
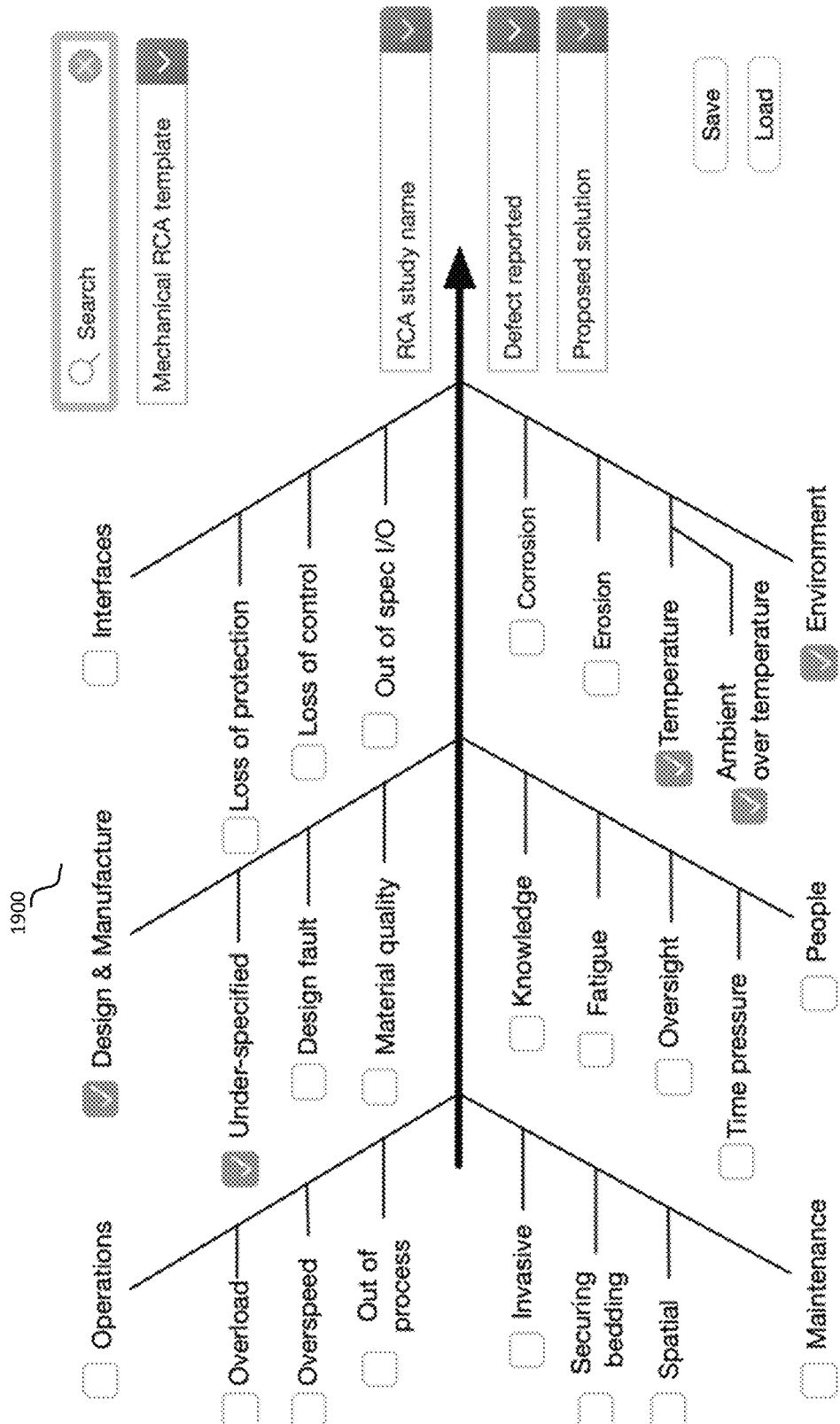
FIG. 19 shows an example of a cause and effect diagram used for root cause analysis in the predictive maintenance management system in accordance with an embodiment of the invention.

In some embodiments of the invention, selecting the "initiate RCA" button of the investigation options screen 1800 starts a root cause analysis process 508 to determine whether there are unexpected or unwanted underlying issues influencing the determined failure pattern (premature failures 506, random failures 504, and wear out failures 505) for the part. FIG. 19 shows an example of a simple cause and effect diagram 1900 that may be used to conduct the RCA. The cause and effect diagram 1900 includes various factors, grouped into different categories, that may be selected to identify the root cause of the failure. For example, in the example shown in FIG. 19, the root cause analysis may identify design and manufacturing issues and environment issues as potential causes or contributing factors associated with failure of a part. This process of identifying the contributing factors may include breaking down the part into more atomic levels and understanding various design, usage, and operational contexts. For example, autonomous assets would not be prone to fatigue as a contributing factor as they are not driven by people. A user may modify the cause and effect diagram 1900 to add new branches related to new groupings of contributing factors, and add additional factors in each branch as the various cause-and-effect chains are investigated and navigated.

Figure 20:
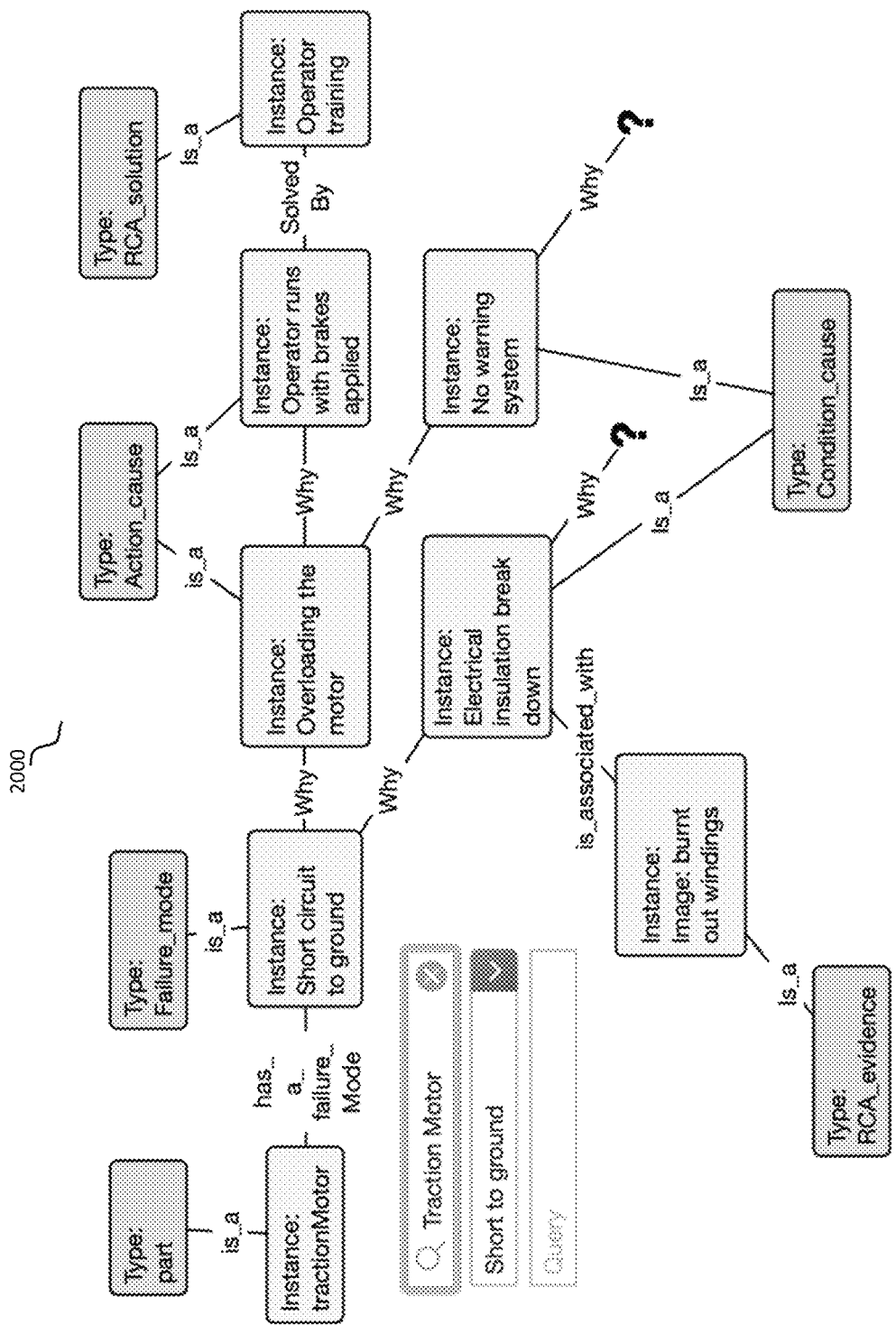
FIG. 20 shows an example of a graph-based root cause analysis approach used in the predictive maintenance management system in accordance with an embodiment of the invention.

In some embodiments, the root cause analysis process 508 includes graphical data structures to identify and store information on conditions and evidence. For example, as shown in FIG. 20, a graph 2000 can be used to facilitate and record a more detailed RCA that includes splitting causes into conditions and actions, and allows the association of evidence and insights with the RCA. The evidence can include rich media such as images, audio, or videos. In the example shown in FIG. 20, a traction motor has been identified as having premature failure caused by a short circuit to ground. Evidence of the cause is provided by images of burnt out windings. An RCA process follows various cause-and-effect chains to determine underlying conditions that may contribute to the failure and potential corrective actions to eliminate these conditions or causes. In the example shown in FIG. 20. the RCA process may query a database to determine potential causes for short circuit—overloading the motor or break down of electrical insulation. Further queries can be generated to get more detailed causal information—overloading of an individual motor can occur due to other motors in parallel being disabled or absence of a warning system. The RCA process can also identify corrective actions that can be taken to eliminate these causes—automated shutdown control systems, operator training or adding a warning.

This information can be automatically generated using causal information databases that store associations between observed failures, evidence supporting that failure, conditions or causes contributing to those failures, and corrective actions. Transactional information, such as that stored in client ERP systems 301 and sensor information 306 can be used to query and prune the graphs to generate the likely causes for the observed failure pattern. In some embodiments, the root cause analysis process 508 may include determining whether RCAs have been previously performed for a similar part or a similar failure. Transactional and sensor data associated with the current failures of the part can be compared to historical information on previous RCAs to determine whether the present failures have similar causes as previous failures or whether a new RCA is required to determine a potential new cause. The historical data can be filtered by time-line to observe new emergent trends in failure modes and changes of percentages as improvements may have been made to reduce unwanted causes of failure.

Figure 21:
FIG. 21 shows another example of a maintenance strategy modification screen of the graphical user interface for the predictive maintenance management system in accordance with an embodiment of the invention.

In some embodiments, the user may select the modify strategy button of the investigation options screen 1800 to display a maintenance strategy modification screen 1700 shown in FIG. 21. In the example shown in FIG. 21, the system 300 determines a random failure pattern, for which the heuristic rule suggests the correct action is to consider an on-condition maintenance strategy. However, the information on replacement events 1720 is sparse and includes two failure events that were very early in the life of the part. The thickness of the shaded confidence band of the distribution 317 also shows that the sample size is small and the random failure mode predicted by the Weibull distribution may not be correct. These observations may indicate that an RCA process should be conducted to determine whether the premature failures had other causes, that may have been corrected, which require a modification of the recommended maintenance strategy 1550. For example, if the premature failure events were caused by operator error, which has been rectified by appropriate training, then the new maintenance strategy 1550 may be to replace the part at 20,000 hours instead of the current 30,000 hours, as indicated by the calculated age of recent replacement dates.

In some embodiments, the user may elect to generate a temporary, palliative on-condition maintenance strategy to contain the effects of premature failures while RCA discovered preventative or corrective actions are implemented. Once the underlying causes of premature failures are eliminated or reduced, a wear-out maintenance and part replacement strategy can be adopted.

In some embodiments, the graphical user interface 1500 includes various sorting and filtering criteria that the user can use to display the determined optimal replacement strategies for the parts. The user can choose to export the displayed recommendations to a file, such as a .csv (comma separated value) file, using an export button 1570. In some embodiments, the predictive maintenance management system 300 sorts the listed parts to collate and prioritise display of parts with non-matching current maintenance strategy 1540 and recommended maintenance strategy 1550. In some embodiments, the user interface 1500 may highlight the parts with non-matching current maintenance strategy 1540 and recommended maintenance strategy 1550, use different fonts, or display parts with change recommendations in a different portion of the user interface from other parts where there is no change in the recommended maintenance strategy. In some embodiments, the user can filter or sort the displayed list of parts based on their own criteria for priorities of criticalities of the listed parts. the user may exercise their own judgement in what constitutes priority in the changing business contexts.

Figure 22:
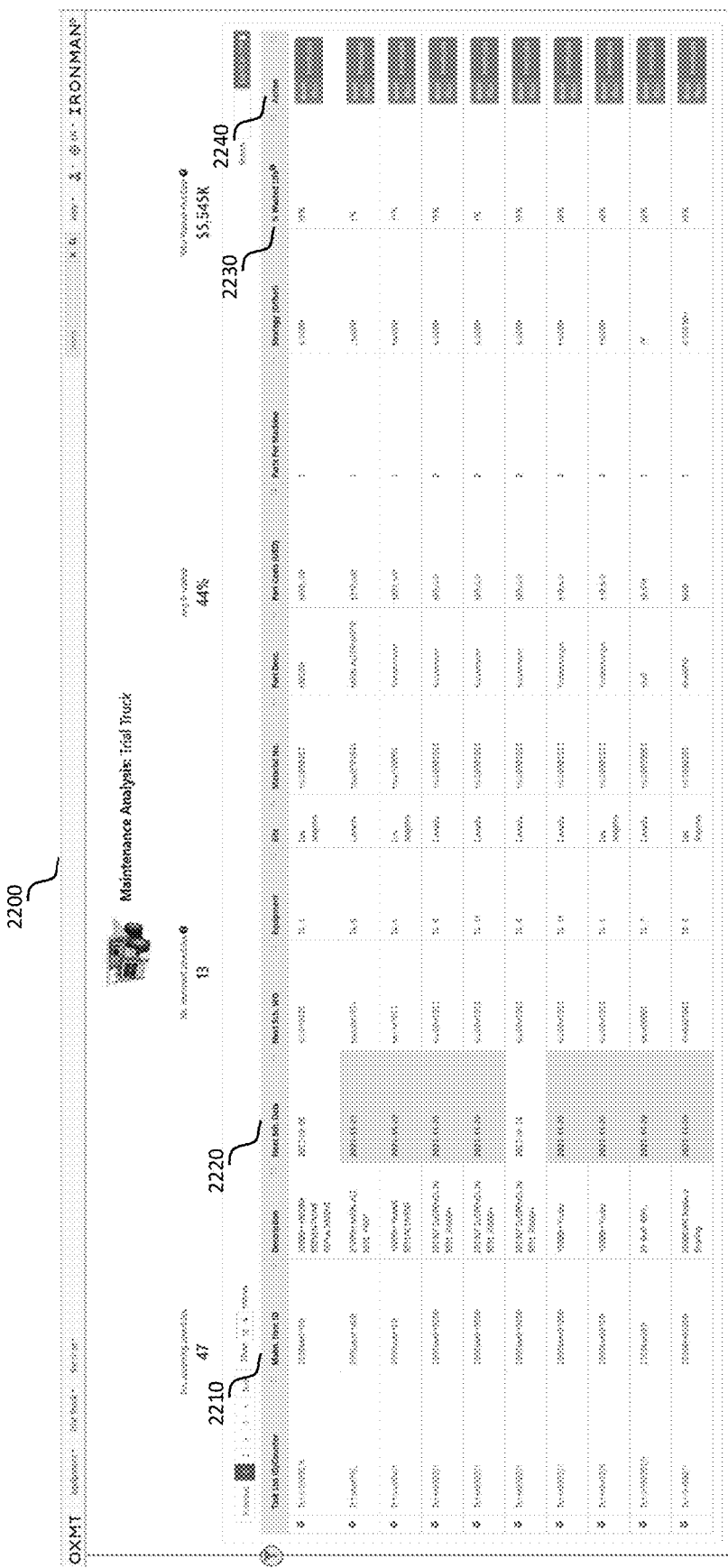
FIG. 22 shows an example of a maintenance analysis screen of the graphical user interface for the predictive maintenance management system in accordance with an embodiment of the invention.

In some embodiments, the predictive maintenance management system 300 compares, in a case where the part is replaced with a functionally equivalent part, the age of the functionally equivalent part to the age required by the part replacement schedule, and updates the maintenance plans 1003 to avoid wasting part life by changing parts unnecessarily. FIG. 22 shows an example of a maintenance analysis screen 2200 included in the graphical user interface 1500. In some embodiments, the maintenance analysis screen 2200 sorts the part replacement schedule, for example, in order of highest percentage wasted life 2230, which is calculated using the age function 316, or in order of the scheduled date of replacement 2220, to collate and prioritise display of maintenance items 2210 that may be unnecessary and result is waste. In some embodiments, the user may select an action 2240 to reset the age clock 1006, so as to skip the scheduled replacement, or investigate further.

Figure 23:
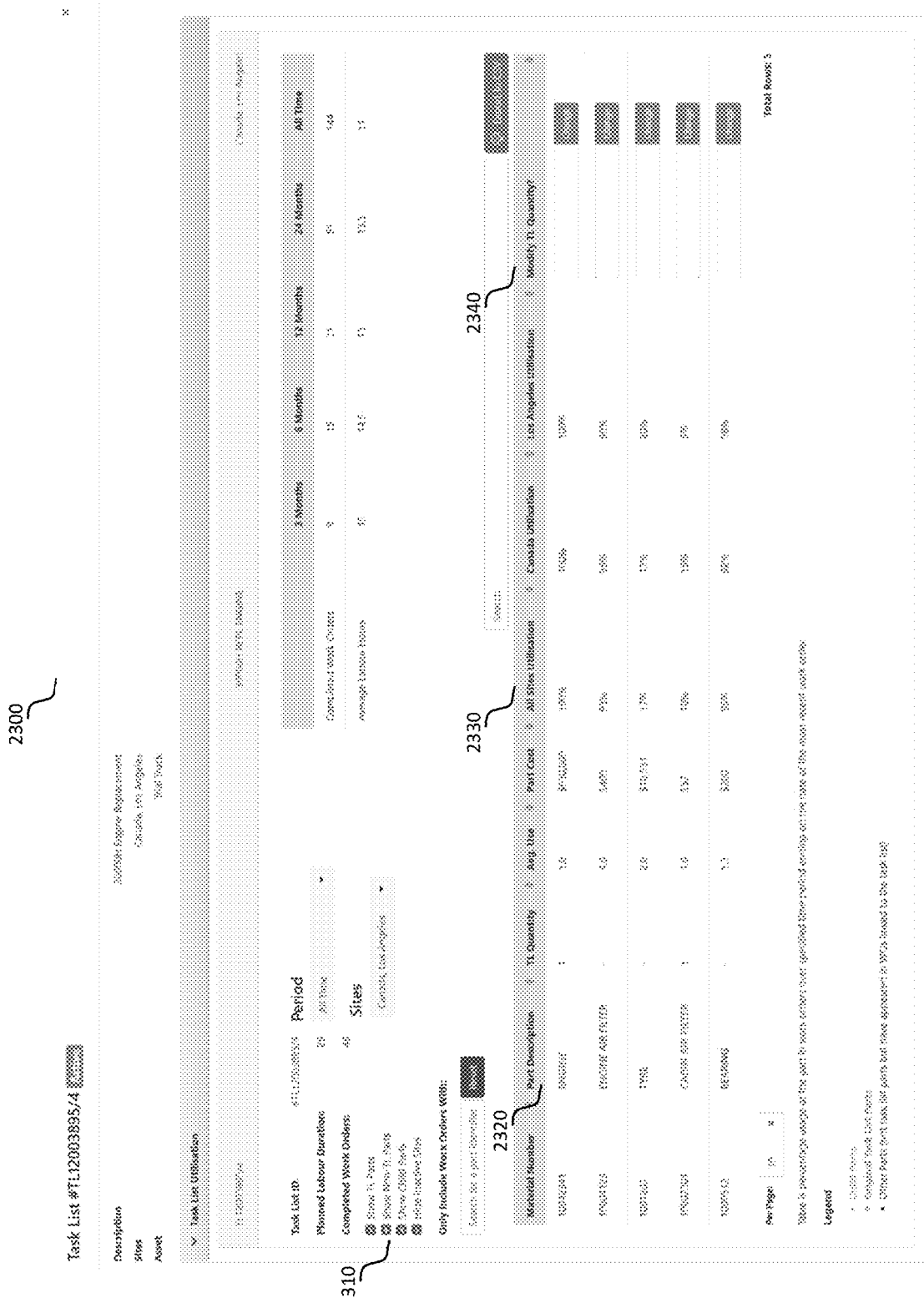
FIG. 23 shows an example of a task list management screen of the graphical user interface for the predictive maintenance management system in accordance with an embodiment of the invention.

In some embodiments, the predictive maintenance management system 300 determines, from the asset history 314, a set of replaced parts. The set of replaced parts is compared with at least one of a task list of parts, an inventory of parts, or a part replacement schedule to determine part utilization in the portfolio of assets. A task list rationalization process 325 adjusts a part ordering schedule and the task list based on the determined part utilisation to avoid over or under ordering parts. FIG. 23 shows an example of a task list analysis screen 2300 included in the graphical user interface 1500. In some embodiments, the task list analysis screen 2300 sorts the part utilisation 2330 to collate and prioritise display of parts 2320 that may, or may not, be included on the task list, for example, using a series of filters 2310. In some embodiments, the user may select the action 2340 to modify the quantity of parts on the task list.

Figure 8:
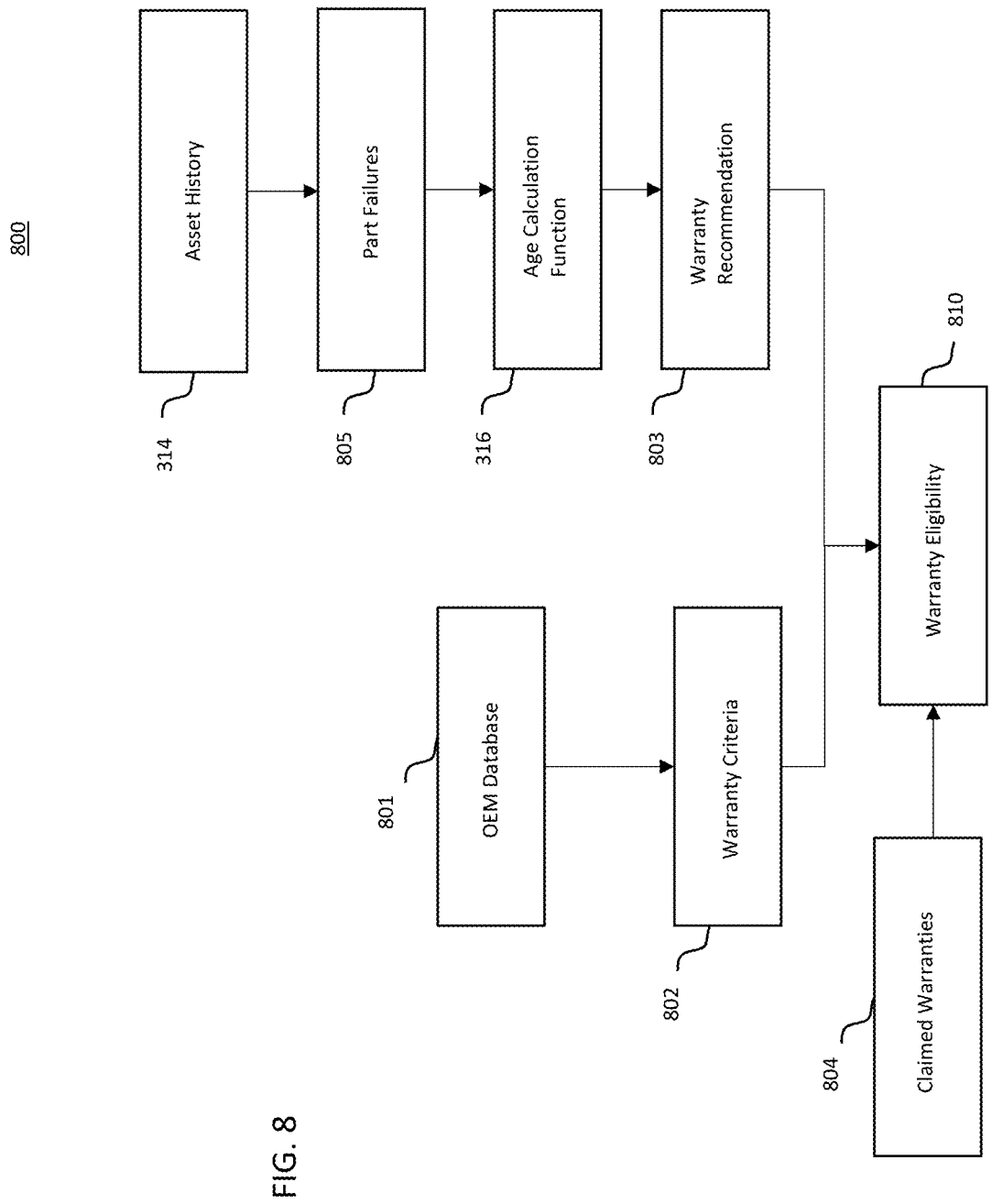
FIG. 8 shows a block diagram illustrating the predictive maintenance management system's warranty eligibility module in accordance with an embodiment of the invention.

FIG. 8 shows a block diagram for a warranty determination system 800 for determining warranty eligibility according to some embodiments of the invention. Information generated by the age calculation function 316 is important to determine whether a failed part is eligible for a warranty claim due to the lack of visibility in the client's maintenance management system 301 showing when the part was last replaced and therefore, what the age of the part is now. The asset history 314 can provide useful information for making a warranty recommendation 803 by accurately determining the age at replacement of the parts which were flagged to have failed 805 in the asset history 314. The warranty eligibility 810 may be determined by checking that a warranty recommendation 803 has not already been claimed by comparing against claimed warranties 804. In some embodiments, the warranty eligibility 810 is further based on warranty criteria 802 as set out in an OEM database 801.

Figure 9:
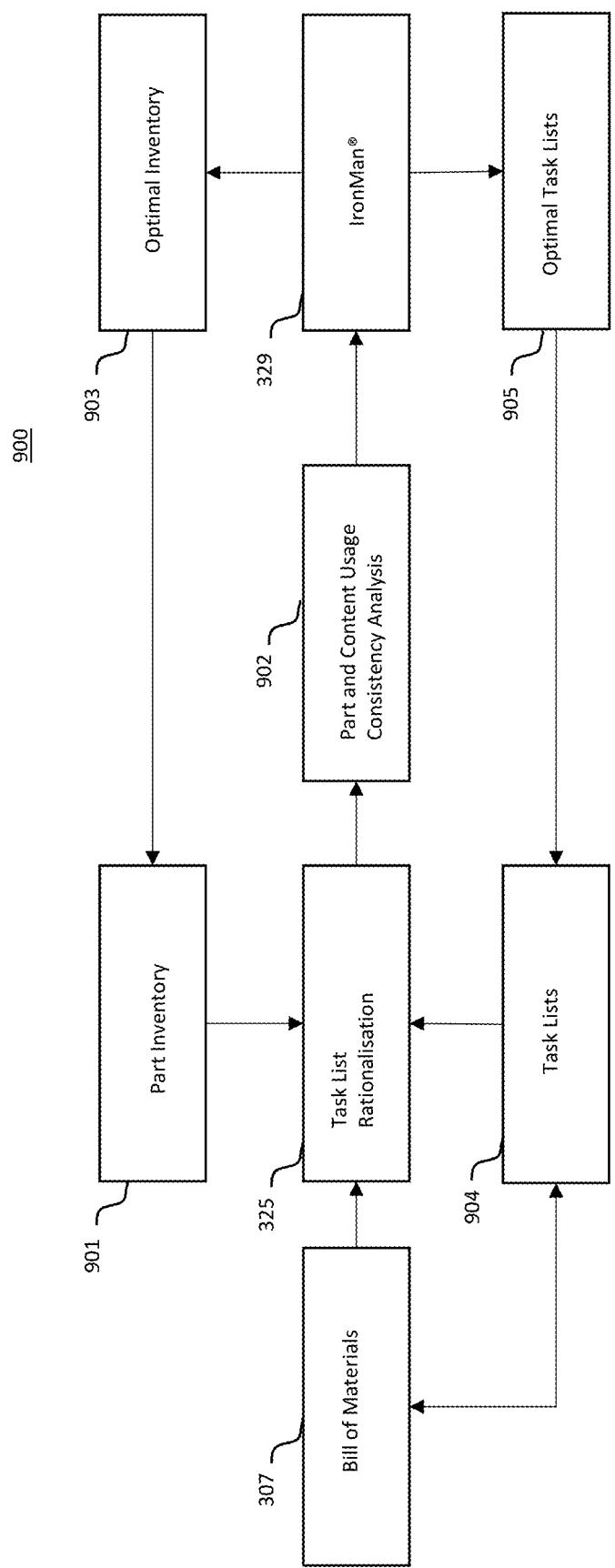
FIG. 9 shows a block diagram illustrating a data consolidation based optimal part inventory management capability in accordance with an embodiment of the invention.

FIG. 9 shows a block diagram for an optimal part inventory determination system 900 according to some embodiments of the invention. In some embodiments, the optimal part inventory 903 is determined based on the task list rationalization process 325. A part inventory 901 is compared to the current task lists 904 in the task list rationalization process 325 and the bill of materials 307, which are required to fulfil those task lists. A part and content usage consistency analysis process 902 identifies which parts may be over or underused, and therefore over or underordered and over or understocked, based on the task lists 904 maintained by the task list rationalization process 325. If the part is not required or used frequently and is overstocked, the IronMan® system 329 may, for example, recommend that the part be ordered less often or not at all. Conversely, if a part is used regularly and is understocked, according to the task list rationalization process 325, the IronMan® system 329 may recommend that the part is ordered more. The recommendations generated by the IronMan® system 329 may be used to determine the optimal part inventory 903 for that site and to generate optimal task lists 905, even if the current task lists 904 do not exist.

Figure 10:
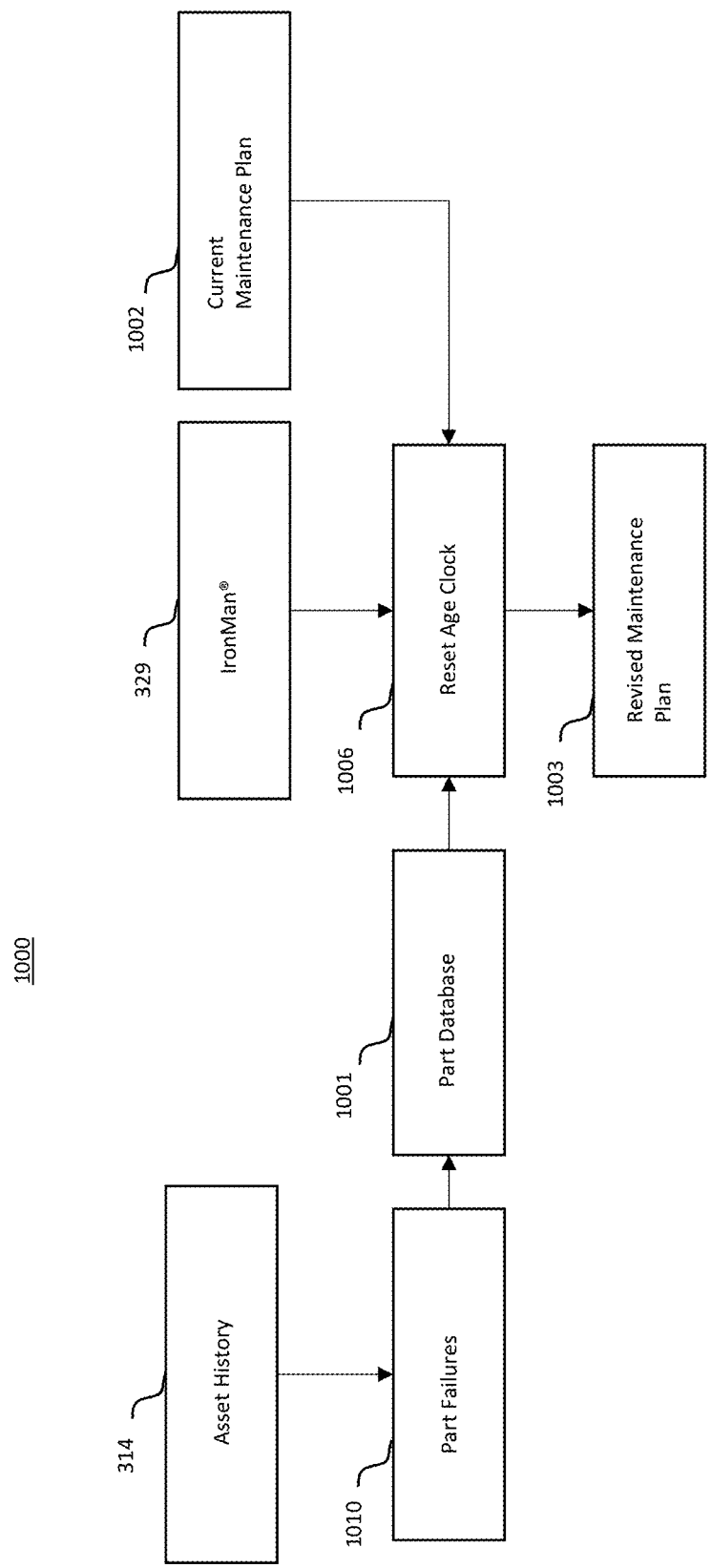
FIG. 10 shows a block diagram illustrating the predictive maintenance management system's maintenance plan revision capability in accordance with an embodiment of the invention.

FIG. 10 shows a block diagram of a system 1000 for updating maintenance plans according to some embodiments of the invention. Revised maintenance plans 1003 are required whenever a part failure 1010 is deemed to have occurred before the scheduled current maintenance plan 1002, and the part has been replaced. If the age of the part is not reset by a reset age clock process 1006, it is very likely that the part will be prematurely replaced under the current maintenance plan 1002. In some embodiments, the IronMan® system 329 supports this functionality and assists the user in prioritisation of age clocks that should be reset by a reset age clock process 1006 and generates a revised maintenance plan 1003 based on an analysis of the current maintenance plans 1002 and the part failures 1010 from the asset history 314. In some embodiments, the IronMan® system 329 includes detailed information (through data consolidation 308) on how parts are connected or functionally equivalent 311 in a part database 1001 and can therefore match part failures 1010 to the current maintenance plans 1002.

Figure 11:
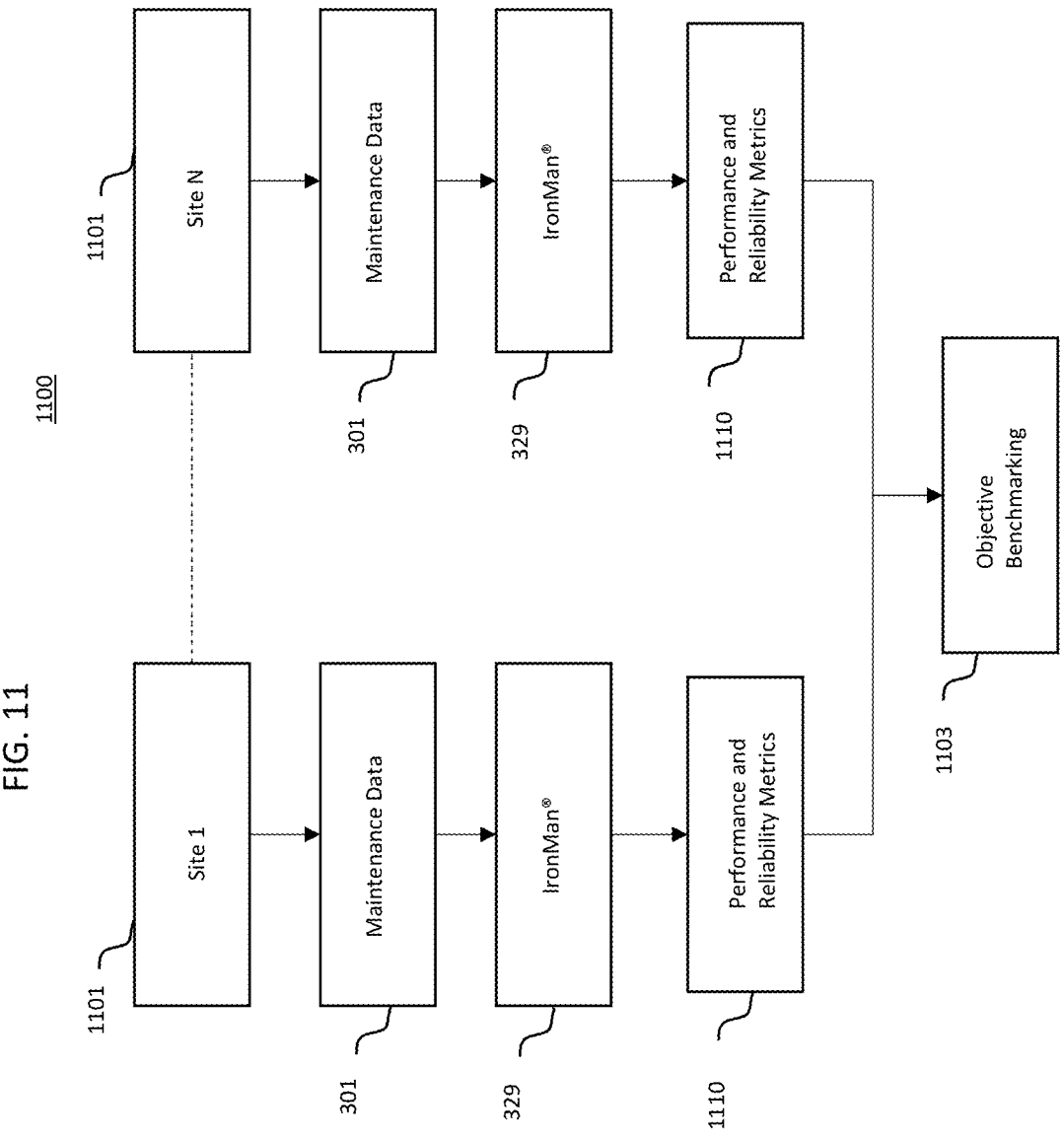
FIG. 11 shows a block diagram illustrating an objective benchmarking system extension of the predictive maintenance management system in accordance with an embodiment of the invention.

FIG. 11 shows a system 1100 for objectively benchmarking a plurality of sites 1101 according to some embodiments of the invention. Without objective performance and reliability metrics generated by the metrics calculator 323, it is difficult for capital intensive operations to benchmark their sites. Objective benchmarking 1103 is important because it is the first step for continuous improvement and has been challenging to implement at sites 1101 because of maintenance data 301 quality issues and variable maintenance practices. In some embodiments, the IronMan® system 329 solves the maintenance data 301 quality issues for multiple sites 1101 and provides, for each site 1101, the same performance and reliability metrics 1110 to deliver objective benchmarking 1103 between the sites 1101. With objective benchmarking 1103, sites 1101 can quickly identify where to focus their efforts to improve performance and reliability metrics 1110 as well as learn best practices from successful sites.

Figure 12:
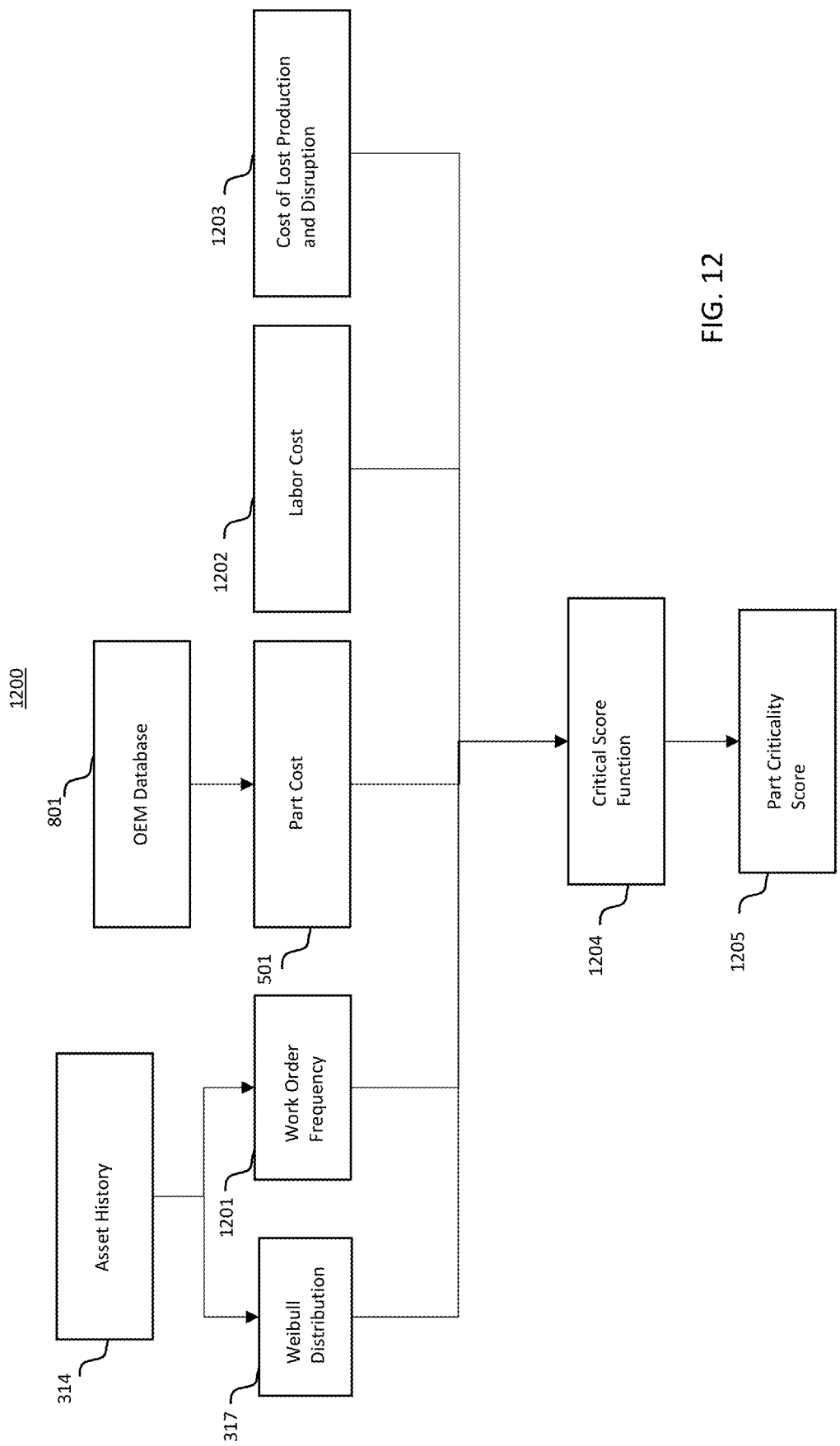
FIG. 12 shows a block diagram illustrating a part criticality score calculation system in accordance with an embodiment of the invention.

FIG. 12 shows a system 1200 for calculating part criticality scores 1205 according to some embodiments of the invention. Although the system identifies functionally significant components, part criticality provides more information that may be used to prioritise remedial action. Criticality utilises one or more of the Weibull distribution 317, work order frequency 1201, part cost 501, labor cost 1202, and cost of lost production and disruption 1203 to calculate a criticality score. Several factors impact the criticality score. The impact of failure may be characterised by a mix of material cost, labour cost for corrective work and the cost equivalent for lost production time while the asset is unavailable. The frequency of the failure events may be a combination of a B-20 age from the Weibull distribution and the number of preventative or corrective work orders per unit time. The detectability of the failure occurring may be derived from the asset history work orders and notifications, with a range of severity from the 'failure was sudden, with no prior warning to operators or maintainers' down to 'the failure showed many different symptoms of failure as the condition slowly deteriorated over time where the symptoms were apparent to the operations or maintenance staff, with enough time before final failure, to plan, schedule and undertake corrective maintenance minimising operational disruption'. An example of a symptom of failure may be an increase in noise, heat, vibration, odours or other visual indications that are indicative of imminent failure.

In some embodiments, a part criticality score 1205 may be generated using a critical score function 1204 from the part's work order frequency 1201, Weibull statistics generated using the Weibull fitter 317, the part's costs 501, the labour cost 1202 to service the work orders, and the cost of lost production and disruption 1203 in the event of a failure. The work order frequency 1201 is determined from the processed work order data 302 and asset history 314. In some embodiments, the calculation of the criticality score 1205 is weighted using B-20 information produced from the Weibull fitter 317. The B-20 information is associated with an age at which 20% of part units in the population are likely to have failed, which helps capture the bad influence of premature failures 506. The part cost 501 is extracted from the client ERP system 302. The part criticality score 1205 is important because it adds a risk management layer to the optimal part inventory maintained by the task list rationalization process 325 by accounting for failure distribution, impact and costs in the inventory decision process.

Figure 24:
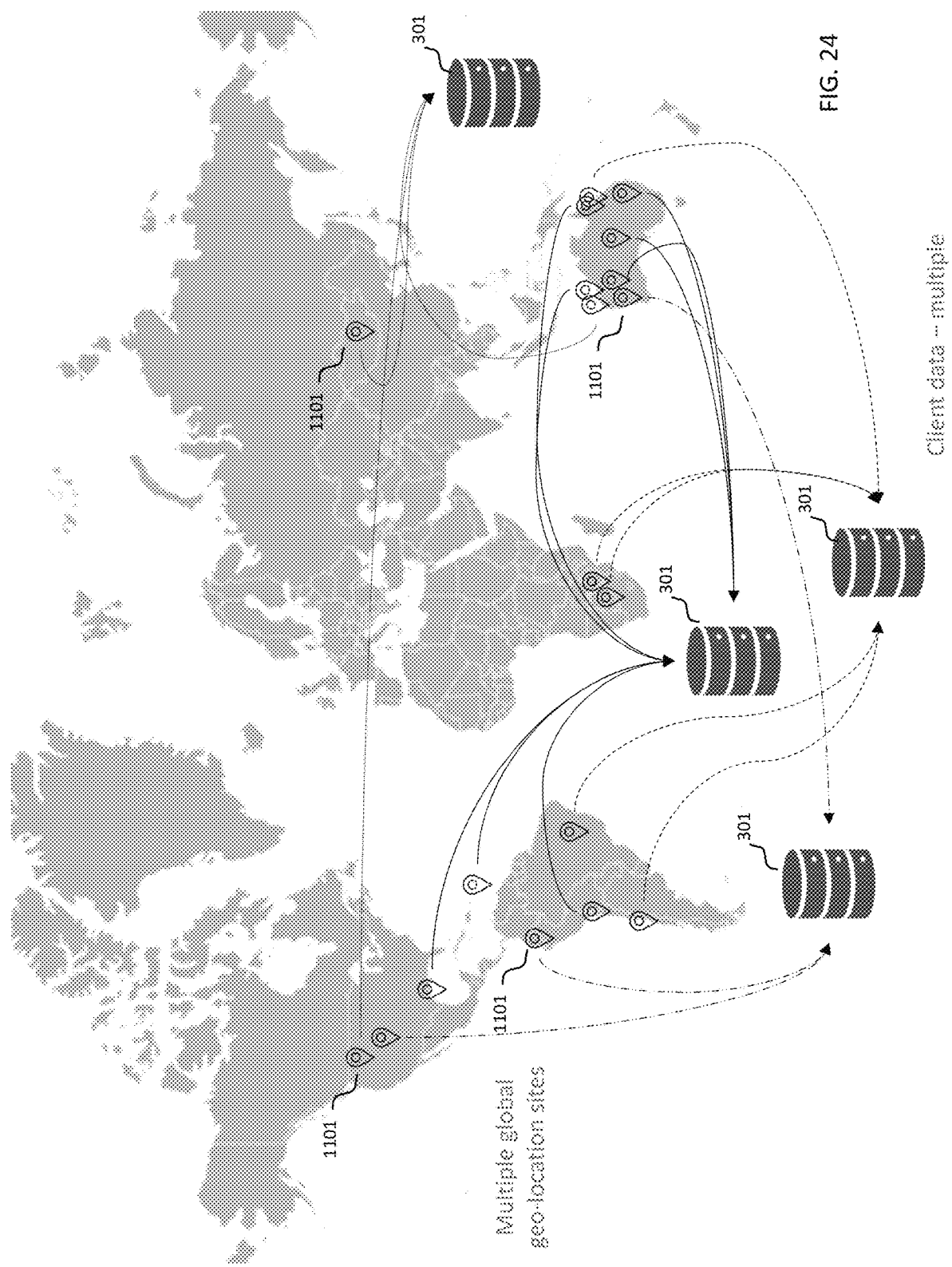
FIG. 24 shows an example of a global site view for the predictive maintenance management system in accordance with an embodiment of the invention.

FIG. 24 shows an example of a global site view for the predictive maintenance management system in accordance with an embodiment of the invention. Global site operations for one or more clients may be connected to the IronMan® system 329 using a client server architecture, for example. In the example shown on FIG. 24, there are four clients, each client having a plurality of sites 1101. In some embodiments, the sites (which could be a mine site, a locomotive workshop, etc.) are in different geolocations that are global and/or national. Within a country, there may be many sites 1101. In some embodiments, data may be stored locally at each site, or in a central client repository for each client. The arrows in FIG. 24 represent the data coming to a centralised repository. The IronMan® system 329 connects to the central repository 301 to perform the maintenance analysis tasks. In some embodiments, a central repository 301 may not exist, and the data is stored locally at each site. In these embodiments, the IronMan® system 329 connects to the local repositories to perform the maintenance analysis tasks. In some embodiments, client data may be stored in on-premise servers, or it could be stored in the cloud; the IronMan® system 329 works with either system. In some embodiments, client data is kept segregated from other clients, for example, for security and intellectual property reasons that may be specific client requirements. However, it is also easy to share data across clients, for example, to provide additional context or benchmarking analysis, where that is a requirement from multiple clients.

As discussed above, the IronMan® system 329 includes the training and application of several machine learning models to generate pertinent data required for determining the optimal maintenance strategies. In some embodiments, the training of the machine learning models may be performed at a server, which has access to the transactional data (maintenance records 302) and sensor data (measurement readings 306) from multiple clients. This approach permits the machine learning models to benefit from a rich variety of data, which promotes generalization. Alternately, the server may segregate the training data by client, or groups of sites, to generate trained models that are more specific to local operating conditions or different client's preferences. In some embodiments, the server continues to receive raw data from the client sites, and applies the trained models to the raw data.

In other embodiments one or more of the trained machine learning models may be deployed at the client sites, so that the raw data is processed at the client or site nodes, and only the generated output needs to be transmitted to the server running the IronMan® system 329. In these embodiments, there is a trade-off between complexity of the client software and the amount of data communication. Pushing the trained machine learning models to the client for execution increases the complexity of the client software and the hardware requirements to run the client software. However, because large amounts of raw data no longer needs to be transmitted to the server, the data communication requirements are dramatically reduced. Tis flexibility permits clients to customize their installation. For example, remote sites with poor connectivity could install the hardware necessary to run the machine learning models on-site while well-connected sites in developed areas could take advantage of cheap and reliable connections to reduce their capital costs and transmit raw data to the server for analysis.

Figure 25:
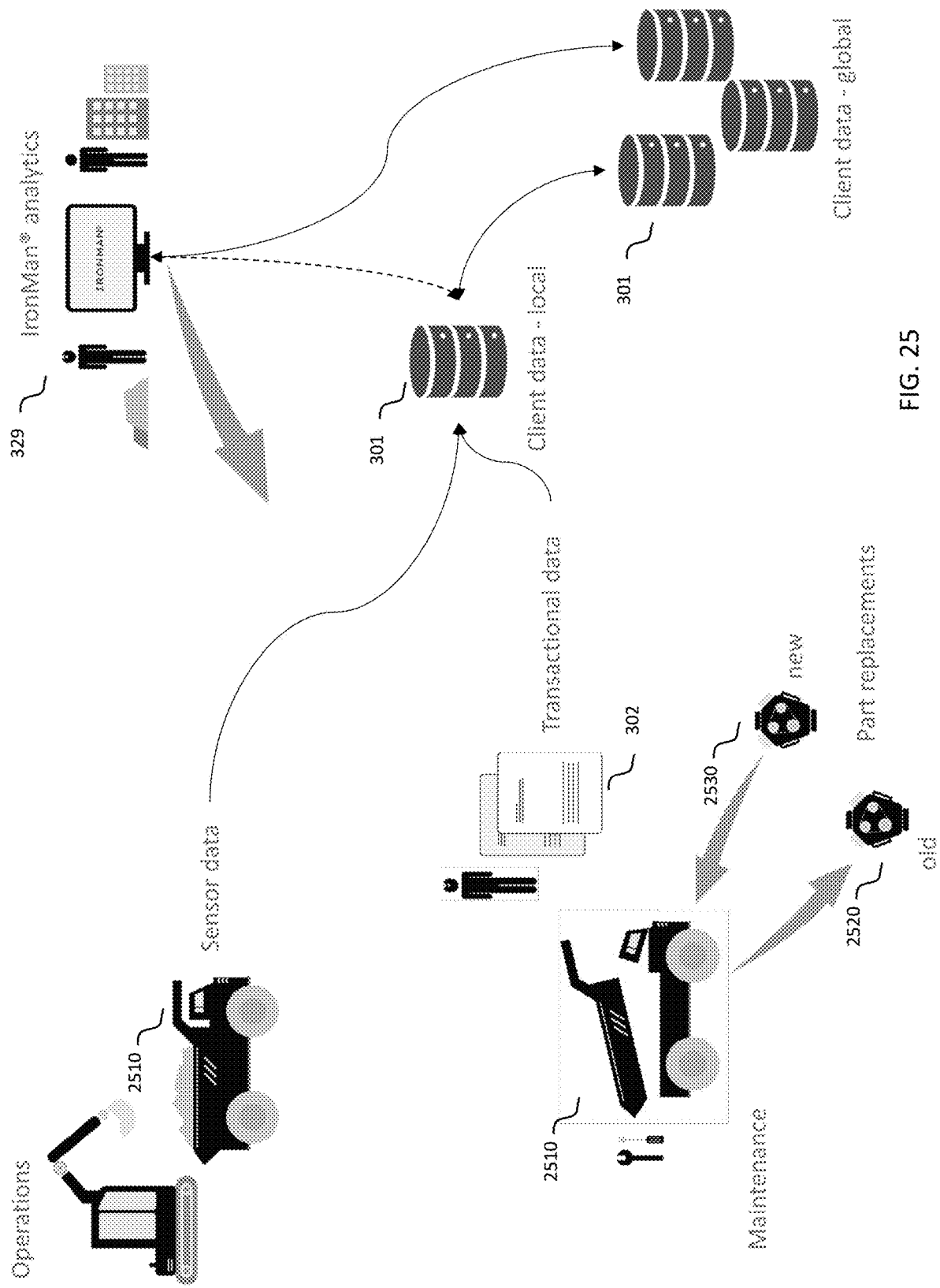
FIG. 25 shows an example of a client site view for the predictive maintenance management system in accordance with an embodiment of the invention.

FIG. 25 shows an example of a client site view for the predictive maintenance management system in accordance with an embodiment of the invention. The example site view of FIG. 25 shows, in the top left, two exemplar assets 2510 (excavator & truck) with both operating, and collecting sensor data while they work. The sensor data is recorded and stored in the client repository 301. An asset 2510 (for example, the truck in lower left of FIG. 25) may go into the maintenance bay for maintenance work—old parts 2520 coming off, new parts 2530 going on. The transactional data icon indicates many things from triggering the maintenance to actually doing it (notifications, work orders, task lists). All of this information is then recorded in local client data 301 for that site. This client data 301 may then be fed into a global client data repository 301 or directly accessed by the IronMan® system 329. As mentioned above, the IronMan® system 329 can also access multiple instances of local data if there is no global system (dotted line in FIG. 25). All of this data is then fed into the IronMan® system for analytics and then back to the offices and sites of the client to improve maintenance.

Figure 26:
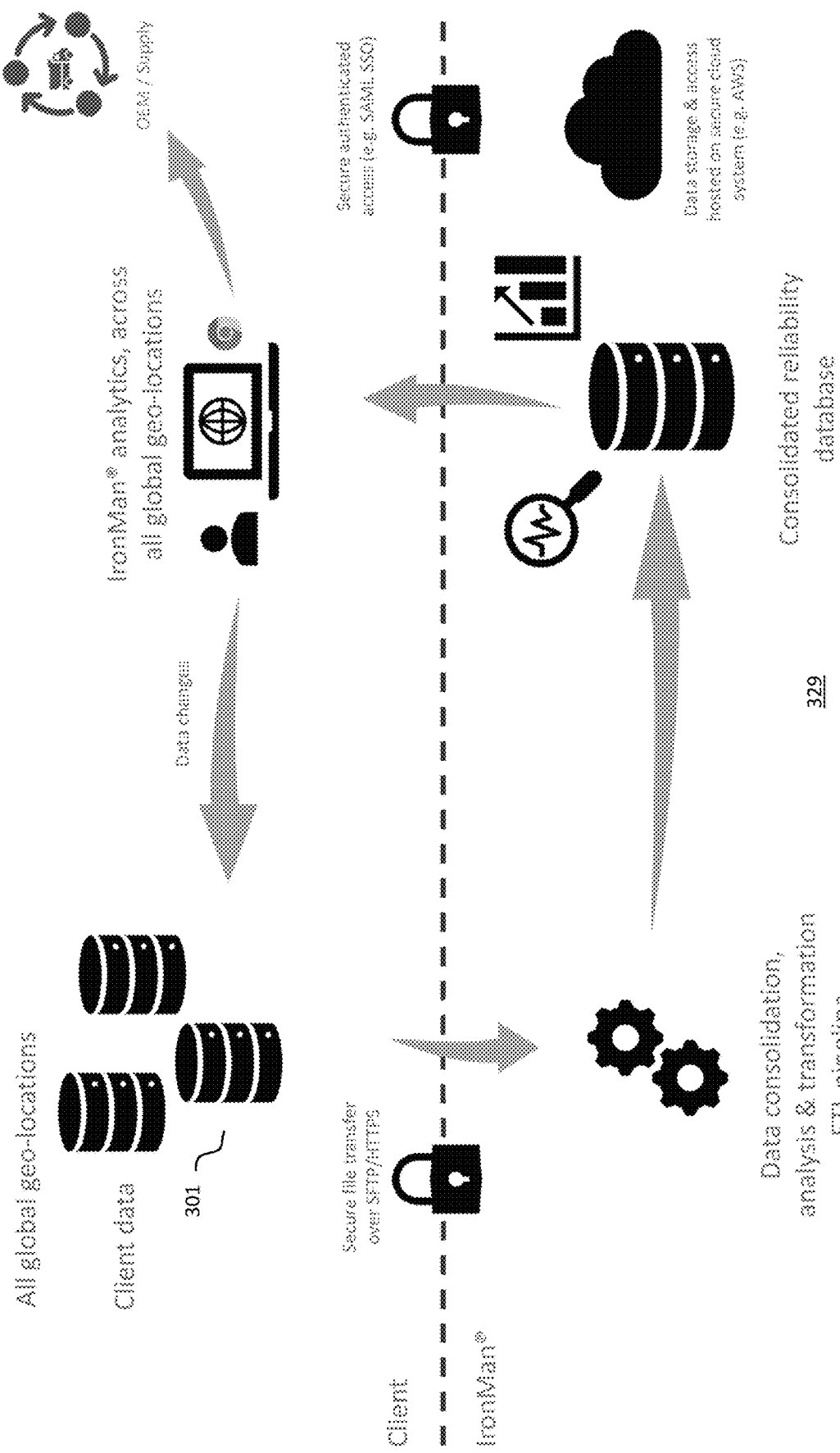
FIG. 26 shows an example of a client server architecture for the predictive maintenance management system in accordance with an embodiment of the invention.

FIG. 26 shows an example of a client server architecture for the predictive maintenance management system in accordance with an embodiment of the invention. More specifically, FIG. 26 shows an example of how the client data 301 is transferred to the IronMan® system 329 from a data communication viewpoint. Client data 301 is transferred to the IronMan® system 329 across a secure connection such as secure file transfer over SFTP/HTTPS. ETL processes and data consolidation into a database takes place within the IronMan® system 329. In some embodiments, the IronMan® system 329 is deployed via cloud services, such as AWS, and is accessible by clients via a web portal. Client access is secure and authenticated. The IronMan® analytics screen in the top right of FIG. 26 is a user interface for the client to interact with the IronMan® system 329.

Based on the above-described embodiments, an aspect of the client-server system that performs machine learning based information fusion to predict part failure likelihood of a plurality of parts in one or more assets of a portfolio comprises at least one computer accessible-storage device configured to store instructions, and at least one processor communicatively connected to the at least one computer accessible storage device and configured to execute instructions that, when executed, provide a plurality of program modules including a data ingestion module, a data consolidation module, and a part-failure determination module. The data ingestion module is configured to receive transactional data pertaining to replacement of, and sensor data pertaining to duty cycle of, one or more parts of the plurality of parts in the one or more assets of the portfolio. The data consolidation module is configured to train a first machine learning model, using the transactional data as training data for the first machine learning model, to extract a plurality of concepts corresponding to the information present in unstructured text in the transactional data, and train a second machine learning model, using the sensor data and the plurality of concepts extracted as output from the first machine learning model as training data for the second machine learning model, to predict part failure likelihood of the one or more parts of the plurality of parts. The part failure determination module is configured to determine the part failure likelihood of the one or more parts of the plurality of parts by providing new transactional data and new sensor data to the trained first machine learning model and the trained second machine learning model.

In another aspect of the client-server system, the data ingestion module is further configured to use timestamp information to associate pieces of transactional data with corresponding pieces of sensor data relating to a same event.

In another aspect of the client-server system, the data consolidation module is further configured to generate an asset history, which includes information on replacement of the one or more parts of the plurality of parts in the one or more assets of the portfolio and information on the duty cycle of the one or more parts of the plurality of parts in the one or more assets of the portfolio, by analysing the plurality of concepts extracted as output from the first machine learning model, the sensor data, and the determined part failure likelihood of the one or more parts of the plurality of parts.

In another aspect of the client-server system, the plurality of program modules further includes a remaining useful life determination module configured to train a third machine learning model, using the generated asset history and the determined part failure likelihood of the one or more parts of the plurality of parts as training data for the third machine learning model, to predict a remaining useful life for the one or more parts of the plurality of parts, and determine the remaining useful life for the one or more parts of the plurality of parts by providing the new transactional data and the new sensor data to the trained third machine learning model.

Another aspect of the client-server system includes a server and at least one client. A processor of the server is configured to execute the data ingestion module to receive the transactional data and the sensor data from the at least one client, and to execute the data consolidation module to train the first machine learning model and the second machine learning model. A processor of the at least one client is configured to execute the part failure determination module to determine the part failure likelihood of the one or more parts of the plurality of parts of the at least one client using the trained first machine learning model and the trained second machine learning model.

Another aspect of the client-server system includes a server and a plurality of clients. A processor of the server is configured to execute the data ingestion module to receive the transactional data and the sensor data from the plurality of clients, and to execute the data consolidation module to train the first machine learning model and the second machine learning model. A first client of the plurality of clients includes a processor configured to execute the part failure determination module to determine the part failure likelihood of the one or more parts of the plurality of parts of the first client using the trained first machine learning model and the trained second machine learning model. A second client of the plurality of clients request the processor of the server to execute the part failure determination module to determine the part failure likelihood of the one or more parts of the plurality of parts of the second client using the trained first machine learning model and the trained second machine learning model.

In another aspect of the client-server system, the data consolidation module is further configured to, in a case where an asset includes a plurality of parts of a same part type and less than all of the plurality of the parts has been replaced, determine a position of a replaced part among the plurality of the parts of the same part type in the asset, and train the first machine learning model and the second machine model by separating the transactional data and the sensor data for the same part type based on the determined position of the replaced part among the plurality of the parts of the same part type.

In another aspect of the client-server system, the data consolidation module is further configured to, in a case where an asset includes a plurality of functionally equivalent parts having different identifiers, group the plurality of functionally equivalent parts as a same part type, and train the first machine learning model and the second machine model by grouping the transactional data and the sensor data for the functionally equivalent parts.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A client-server system that performs machine learning based information fusion to predict part failure likelihood of a plurality of parts in one or more assets of a portfolio, the system comprising:
at least one computer accessible-storage device configured to store instructions; and
at least one processor communicatively connected to the at least one computer accessible storage device and configured to execute the stored instructions to:
receive transactional data pertaining to replacement of, and sensor data pertaining to duty cycle of, one or more parts of the plurality of parts in the one or more assets of the portfolio, the transactional data including unstructured textual data and first structured data;
convert the unstructured textual data into second structured data usable for machine learning by training a first neural network model, using the first structured data in the transactional data and an ontology as training data for the first neural network model, to extract a plurality of text tags that define second structured data corresponding to the information present in the unstructured textual data in the transactional data;
train a second neural network model, using the sensor data, the first structured data included in the transactional data, and the converted second structured data corresponding to the unstructured textual data included in the transactional data as training data for the second neural network model, to predict part failure likelihood of the one or more parts of the plurality of parts; and
determine the part failure likelihood of the one or more parts of the plurality of parts by providing new transactional data and new sensor data to the trained first neural network model and the trained second neural network model.

2. The client-server system of claim 1, wherein the at least one processor is further configured to execute the stored instructions to use timestamp information to associate pieces of transactional data with corresponding pieces of sensor data relating to a same event.

3. The client-server system of claim 1, wherein the at least one processor is further configured to execute the stored instructions to generate an asset history, which includes information on replacement of the one or more parts of the plurality of parts in the one or more assets of the portfolio and information on a duty cycle of the one or more parts of the plurality of parts in the one or more assets of the portfolio, by analysing the plurality of text tags extracted as output from the first neural network model, the first structured data included in the transactional data, the sensor data, and the determined part failure likelihood of the one or more parts of the plurality of parts.

4. The client-server system of claim 3, wherein the at least one processor is further configured to execute the stored instructions to:
train a third neural network model, using the generated asset history and the determined part failure likelihood of the one or more parts of the plurality of parts as training data for the third neural network model, to predict a remaining useful life for the one or more parts of the plurality of parts; and
determine the remaining useful life for the one or more parts of the plurality of parts by providing the new transactional data and the new sensor data to the trained third neural network model.

5. The client-server system of claim 1,
wherein the client-server system includes a server and at least one client,
wherein a processor of the server is configured to execute the stored instructions to receive the transactional data and the sensor data from the at least one client, and to execute the stored instructions to train the first neural network model and the second neural network model, and
wherein a processor of the at least one client is configured to execute the stored instructions to determine the part failure likelihood of the one or more parts of the plurality of parts of the at least one client using the trained first neural network model and the trained second neural network model.

6. The client-server system of claim 1,
wherein the client-server system includes a server and a plurality of clients,
wherein a processor of the server is configured to execute the stored instructions to receive the transactional data and the sensor data from the plurality of clients, and to execute the stored instructions to train the first neural network model and the second neural network model,
wherein a first client of the plurality of clients includes a processor configured to execute the stored instructions to determine the part failure likelihood of the one or more parts of the plurality of parts of the first client using the trained first neural network model and the trained second neural network model, and
wherein a second client of the plurality of clients is configured to request the processor of the server to execute the stored instructions to determine the part failure likelihood of the one or more parts of the plurality of parts of the second client using the trained first neural network model and the trained second neural network model.

7. The client-server system of claim 1, wherein the at least one processor is further configured to execute the stored instructions to, in a case where an asset includes a plurality of parts of a same part type and less than all of the plurality of the parts has been replaced:
determine a position of a replaced part among the plurality of the parts of the same part type in the asset; and
train the first neural network model and the second neural network model by separating the transactional data and the sensor data for the same part type based on the determined position of the replaced part among the plurality of the parts of the same part type.

8. The client-server system of claim 1, wherein the at least one processor is further configured to execute the stored instructions to, in a case where an asset includes a plurality of functionally equivalent parts having different identifiers:
group the plurality of functionally equivalent parts as a same part type; and
train the first neural network model and the second neural network model by grouping the transactional data and the sensor data for the functionally equivalent parts.

9. A processor executed method of performing machine learning based information fusion to predict part failure likelihood of a plurality of parts in one or more assets of a portfolio, the method comprising:
receiving transactional data pertaining to replacement of, and sensor data pertaining to duty cycle of, one or more parts of the plurality of parts in the one or more assets of the portfolio, the transactional data including unstructured textual data and first structured data;

converting the unstructured textual data into second structured data usable for machine learning by training a first neural network model, using the first structured data in the transactional data and an ontology as training data for the first neural network model, to extract a plurality of text tags that define second structured data corresponding to the information present in the unstructured textual data in the transactional data; and training a second neural network model, using the sensor data, the first structured data included in the transactional data, and the converted second structured data corresponding to the unstructured textual data included in the transactional data as training data for the second neural network model, to predict part failure likelihood of the one or more parts of the plurality of parts; and determining the part failure likelihood of the one or more parts of the plurality of parts by providing new transactional data and new sensor data to the trained first neural network model and the trained second neural network model.

10. A non-transitory computer readable storage medium configured to store a program, executed by a computer, for a client-server system that performs machine learning based information fusion to predict part failure likelihood of a plurality of parts in one or more assets of a portfolio, the program comprising computer-executable instructions to:

receive transactional data pertaining to replacement of, and sensor data pertaining to duty cycle of, one or more parts of the plurality of parts in the one or more assets of the portfolio, the transactional data including unstructured textual data and first structured data;

convert the unstructured textual data into second structured data usable for machine learning by training a first neural network model, using the first structured data in the transactional data and an ontology as training data for the first neural network model, to extract a plurality of text tags that define second structured data corresponding to the information present in the unstructured textual data in the transactional data;

train a second neural network model, using the sensor data, the first structured data included in the transactional data, and the converted second structured data corresponding to the unstructured textual data included in the transactional data as training data for the second neural network model, to predict part failure likelihood of the one or more parts of the plurality of parts; and determine the part failure likelihood of the one or more parts of the plurality of parts by providing new transactional data and new sensor data to the trained first neural network model and the trained second neural network model.

* * * * *